US008498647B2

(12) United States Patent
Gorokhov et al.

(10) Patent No.: US 8,498,647 B2
(45) Date of Patent: Jul. 30, 2013

(54) DISTRIBUTED DOWNLINK COORDINATED MULTI-POINT (COMP) FRAMEWORK

(75) Inventors: Alexei Y. Gorokhov, San Diego, CA (US); Siddhartha Mallik, San Diego, CA (US); Naga Bhushan, San Diego, CA (US); Alan Barbieri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 772 days.

(21) Appl. No.: 12/547,395

(22) Filed: Aug. 25, 2009

(65) Prior Publication Data

US 2010/0056215 A1    Mar. 4, 2010

Related U.S. Application Data

(60) Provisional application No. 61/092,490, filed on Aug. 28, 2008.

(51) Int. Cl.
*H04W 40/00* (2009.01)
(52) U.S. Cl.
USPC ........... 455/446; 370/328; 370/329; 370/330; 455/447; 455/448; 455/449; 455/450; 455/452.1
(58) Field of Classification Search
USPC ....................................................... 455/446
See application file for complete search history.

(56) References Cited

U.S. PATENT DOCUMENTS 6,449,641 B1 * 9/2002 Moiin et al. .................. 709/220
(Continued)

FOREIGN PATENT DOCUMENTS

| CN | 101119585 A | 2/2008 |
|---|---|---|
| RU | 2325030 C2 | 5/2008 |

(Continued)

OTHER PUBLICATIONS

3GPP: "3rd Generation Partnership Project; Technical Specification Group Radio Access Network; Further Advancements for E-UTRA Physical Layer Aspects (Release X)" Oct. 6, 2008, 3GPP Draft; TR 36.814_010, 3rd Generation Partnership Project (3GPP), Mobile Competence Centre; 650, Route Des Lucioles; F-06921 Sophia-Antipolis Cedex; France, XP050317365, paragraph [0008].

(Continued)

*Primary Examiner* — Charles Appiah
*Assistant Examiner* — Mazda Sabouri
(74) *Attorney, Agent, or Firm* — Florin Corie

(57) ABSTRACT

Systems and methodologies are described that facilitate dynamically forming clusters in a wireless communication environment. A set of non-overlapping clusters can be formed dynamically over time and in a distributed manner. Each of the clusters can include a set of base stations and a set of mobile devices. The clusters can be yielded based upon a set of local strategies selected by base stations across the network converged upon through message passing. For example, each base station can select a particular local strategy as a function of time based upon network-wide utility estimates respectively conditioned upon implementation of the particular local strategy and disparate possible local strategies that can cover the corresponding base station. Moreover, operation within each of the clusters can be coordinated.

47 Claims, 18 Drawing Sheets

U.S. PATENT DOCUMENTS

| | | | |
|---|---|---|---|
| 7,308,418 B2 | 12/2007 | Malek et al. | |
| 7,706,838 B2 | 4/2010 | Atsmon et al. | |
| 2003/0040317 A1* | 2/2003 | Fattouch | 455/446 |
| 2006/0268791 A1* | 11/2006 | Cheng et al. | 370/338 |
| 2007/0091863 A1 | 4/2007 | Sampath et al. | |
| 2008/0104257 A1 | 5/2008 | Olston | |
| 2010/0040006 A1* | 2/2010 | Caire | 370/329 |
| 2010/0041407 A1* | 2/2010 | Caire et al. | 455/446 |
| 2010/0144334 A1 | 6/2010 | Gorokhov et al. | |

FOREIGN PATENT DOCUMENTS

| | | |
|---|---|---|
| TW | 200302648 | 8/2003 |
| WO | 2004001994 A2 | 12/2003 |
| WO | 2004002001 A2 | 12/2003 |
| WO | 2007138453 | 12/2007 |
| WO | 2008058224 | 5/2008 |

OTHER PUBLICATIONS

"A discussion on some technology components for LTE-Advanced" 3GPP Draft; R1-082024 (LTE-Advanced Technology Components), 3rd Generation Partnership Project (3GPP), Mobile Competence Centre; 650, Route Des Lucioles; F-06921 Sophia-Antipolis Cedex; France, vol. RAN WGI, No. Kansas City, USA; 20080514, May 14, 2008, XP050110365, the whole document.

Ericsson: "Downlink coordinated transmission—Impact on specification" Oct. 6, 2008, 3GPP Draft; R1-083931, 3rd Generation Partnership Project (3GPP), Mobile Competence Centre; 650, Route Des Lucioles; F-06921 Sophia-Antipolis Cedex; France, XP050317240.

Jungnickel V et al: "Implementation concepts for distributed cooperative transmission" Oct. 26, 2008, Signals, Systems and Computers, 2008 42nd Asilomar Conference on, IEEE, Piscataway, NJ, USA, pp. 1035-1039, XP031475445.

Huawei: "Inter-eNB and Intra-eNB Schemes for CoMP in LTE-Advanced" 3GPP Draft TSG RAN WG#54; R1-083050, 3rd Generation Partnership Project (3GPP), Jeju, Korea, (Aug. 18-22, 2008).

International Search Report and Written Opinion—PCT/US2009/055238, International Search Authority—European Patent Office Jul. 16, 2010.

Motorola: "LTE—A Multiple Point Coordination and Its Classification" 3GPP Draft TSG-RAN WG1 #54; R1-083229, 3rd Generation Partnership Project (3GPP), Jeju, South Korea, (Aug. 18-22, 2008).

Papadogiannis, A. et al: "A Dynamic Clustering Approach in Wireless Networks with Multi-Cell Cooperative Processing." IEEE Communications, 2008. Piscataway, NJ, USA, May 19, 2008, pp. 4033-4037.

Texas Instruments: "Network MIMO Precoding" 3rd Generation Partnership Project (3GPP) TSG RAN WG1 #553bis; No. RI-082497, Jul. 4, 2008, pp. 1-4, XP002559609.

International Search Report and Written Opinion—PCT/US2009/067519, International Searching Authority—European Patent Office, Apr. 9, 2010.

Taiwan Search Report—TW098129074—TIPO—Nov. 15, 2012.

* cited by examiner

DISTRIBUTED DOWNLINK COORDINATED MULTI-POINT (COMP) FRAMEWORK

CLAIM OF PRIORITY UNDER 35 U.S.C. §119

The present Application for Patent claims priority to Provisional Application No. 61/092,490 entitled "DISTRIBUTED DL COOPERATION FRAMEWORK FOR USE IN MIMO SYSTEMS" filed Aug. 28, 2008, and assigned to the assignee hereof and hereby expressly incorporated by reference herein.

BACKGROUND

1. Field

The following description relates generally to wireless communications, and more particularly to dynamically selecting clustering strategies in a distributed manner in a wireless communication environment that employs downlink coordinated multi-point (CoMP).

2. Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Traditionally, in a wireless communication network with multiple base stations and multiple mobile devices, each mobile device is typically associated with a particular one of the multiple base stations. For instance, a mobile device can be associated with a given base station as a function of various factors such as signal strength, Channel Quality Indicator (CQI), and so forth. Thus, the mobile device can be served by the given base station (e.g., uplink and downlink transmissions can be exchanged there between, . . . ), while other base stations in vicinity can generate interference.

Moreover, cooperation between base stations has become more commonly leveraged. In particular, multiple base stations in a wireless communication network can be interconnected, which can allow for sharing data between base stations, communicating there between, and so forth. For instance, in a wireless communication network deployment across a city, base stations included in the deployment can serve a set of mobile devices located within proximity of the base stations. Such deployment oftentimes utilize a common, centralized scheduler; thus, a scheduler decision can be rendered to transmit from the base stations in the deployment to a first mobile device during a first time period, a second mobile device during a second time period, and so forth. However, centralized scheduling can be difficult at best to perform. Moreover, involvement of all (or most) base stations from the deployment when serving a particular mobile device can be impractical and unneeded due to connectivity between base stations.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with dynamically forming clusters in a wireless communication environment. A set of non-overlapping clusters can be formed dynamically over time and in a distributed manner. Each of the clusters can include a set of base stations and a set of mobile devices. The clusters can be yielded based upon a set of local strategies selected by base stations across the network converged upon through message passing. For example, each base station can select a particular local strategy as a function of time based upon network-wide utility estimates respectively conditioned upon implementation of the particular local strategy and disparate possible local strategies that can cover the corresponding base station. Moreover, operation within each of the clusters can be coordinated.

According to related aspects, a method is described herein. The method can include evaluating local utilities of possible local strategies involving a base station at a given time. Further, the method can include exchanging strategy and utility information with at least one neighbor base station through message passing. Moreover, the method can include generating network-wide utility estimates for the possible local strategies as a function of the strategy and utility information received from the at least one neighbor base station through message passing and the evaluated local utilities. The method can also include selecting a particular local strategy from the possible local strategies for use by the base station based upon the network-wide utility estimates.

Another aspect relates to a wireless communications apparatus. The wireless communications apparatus can include at least one processor. The at least one processor can be configured to analyze local utilities of possible local strategies. The at least one processor can additionally be configured to implement message passing to exchange strategy and utility information with at least one neighbor base station. Moreover, the at least one processor can be configured to estimate network-wide utilities for the possible local strategies as a function of the strategy and utility information obtained from the at least one neighbor base station and the analyzed local utilities. Further, the at least one processor can be configured to form a cluster based upon a particular local strategy chosen from the possible local strategies based upon the estimates of the network-wide utilities.

Yet another aspect relates to a wireless communications apparatus. The wireless communications apparatus can include means for choosing a particular local strategy as a function of time based upon network-wide utility estimates respectively conditioned upon the particular local strategy and disparate possible local strategies. Moreover, the wireless communications apparatus can include means for controlling operation within a cluster dynamically formed based upon the chosen particular local strategy.

Still another aspect relates to a computer program product that can comprise a computer-readable medium. The computer-readable medium can include code for causing at least one computer to select a particular local strategy that includes a base station as a function of time based upon network-wide utility estimates respectively conditioned upon implementation of the particular local strategy and disparate possible local strategies that include the base station. Further, the computer-readable medium can include code for causing at least one computer to coordinate operation within a cluster formed according to the selected particular local strategy.

Yet another aspect relates to an apparatus that can include a clustering component that dynamically selects a local strategy to implement with a base station from a set of possible local strategies, wherein the possible local strategies enable the base station to cooperate with one or more neighbor base stations. Moreover, the apparatus can include a metric evaluate component that analyzes local utilities of the possible local strategies in the set. Further, the apparatus can include a negotiation component that employs message passing to agree on compatible local strategies across a network.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
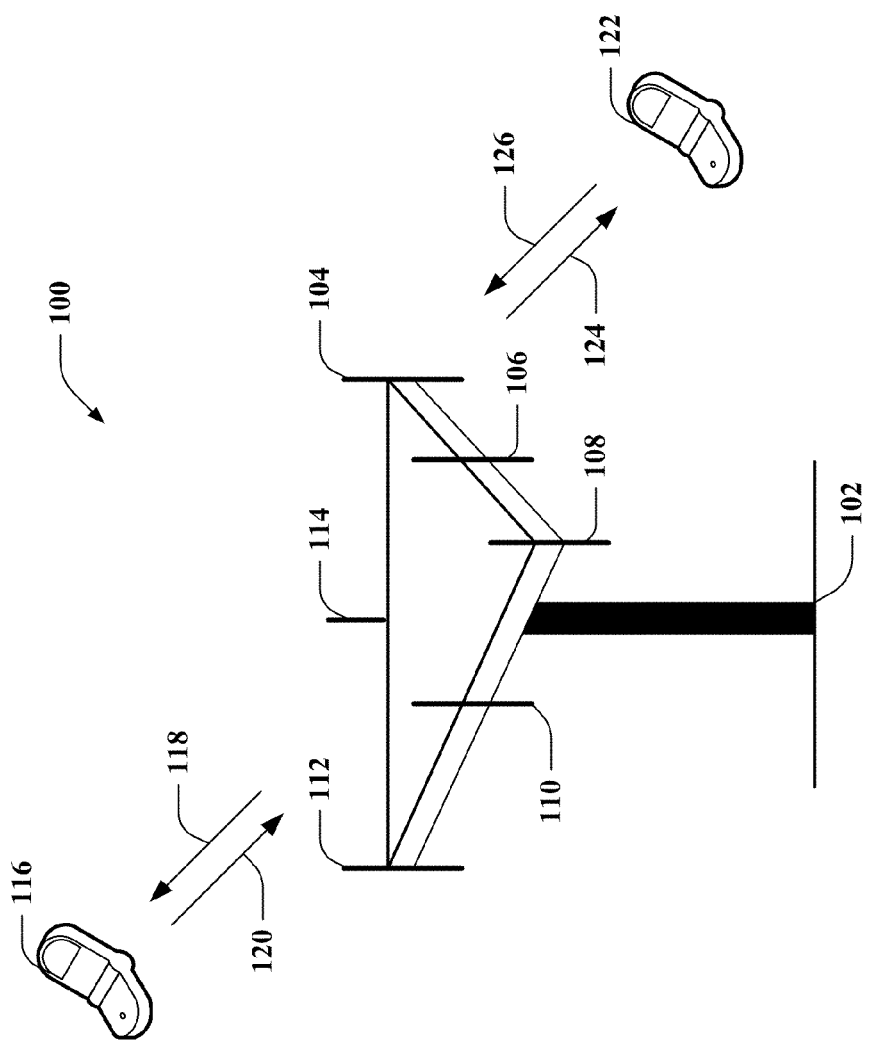
FIG. 1 is an illustration of a wireless communication system in accordance with various aspects set forth herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal can be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station can be utilized for communicating with wireless terminal(s) and can also be referred to as an access point, a Node B, an Evolved Node B (eNode B, eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and Ultra Mobile Broadband (UMB) are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Base station 102 and mobile devices 116, 122 can be employed in connection with dynamic clustering in a coordinated multi-point (COMP) environment (e.g., network multiple-input multiple-output (MIMO) environment, . . . ). Dynamic clustering can be utilized to adapt cooperation strategies to an actual deployment and can be based upon location and/or priority of active users (e.g., mobile devices 116, 122, disparate mobile devices (not shown), . . . ), which can vary over time. Dynamic clustering can mitigate a need for network planning and cluster boundaries, while potentially yielding an enhanced throughput/fairness tradeoff.

In contrast, conventional CoMP approaches typically utilize cooperation strategies based on predetermined static clustering of network nodes (e.g., base stations including base station 102, . . . ). Hence, static master clusters can commonly be chosen based on assumed network topology such as hexagonal layout or known quality of backhaul links within master clusters within a Remote Radio Head context (e.g., Remote Radio Head configurations can include one or more remote nodes connected to a macro base station via high quality backhaul links, . . . ). Moreover, interference at boundaries of master clusters can be handled by traditional interference management techniques such as, for instance, fractional reuse, etc. While dynamic cooperative transmissions can be sent within static clusters, such conventional techniques differ from approaches set forth herein where clustering strategies are dynamically selected.

System 100 can dynamically select clustering strategies in a CoMP environment. More particularly, base station 102 and disparate base station(s) can each effectuate distributed decisions to converge to an optimized set of clusters at a given point in time. The distributed decisions effectuated by base station 102 and the disparate base station(s) can be based on a finite order strategy constraint to limit complexity of inter-site multi-antenna scheduling and packet sharing. Further, a utility based distributed negotiation framework based on message passing (e.g., using a belief propagation framework, . . . ) can be leveraged by base station 102 and the disparate base station(s) to dynamically yield the clustering strategy decisions.

Figure 2:
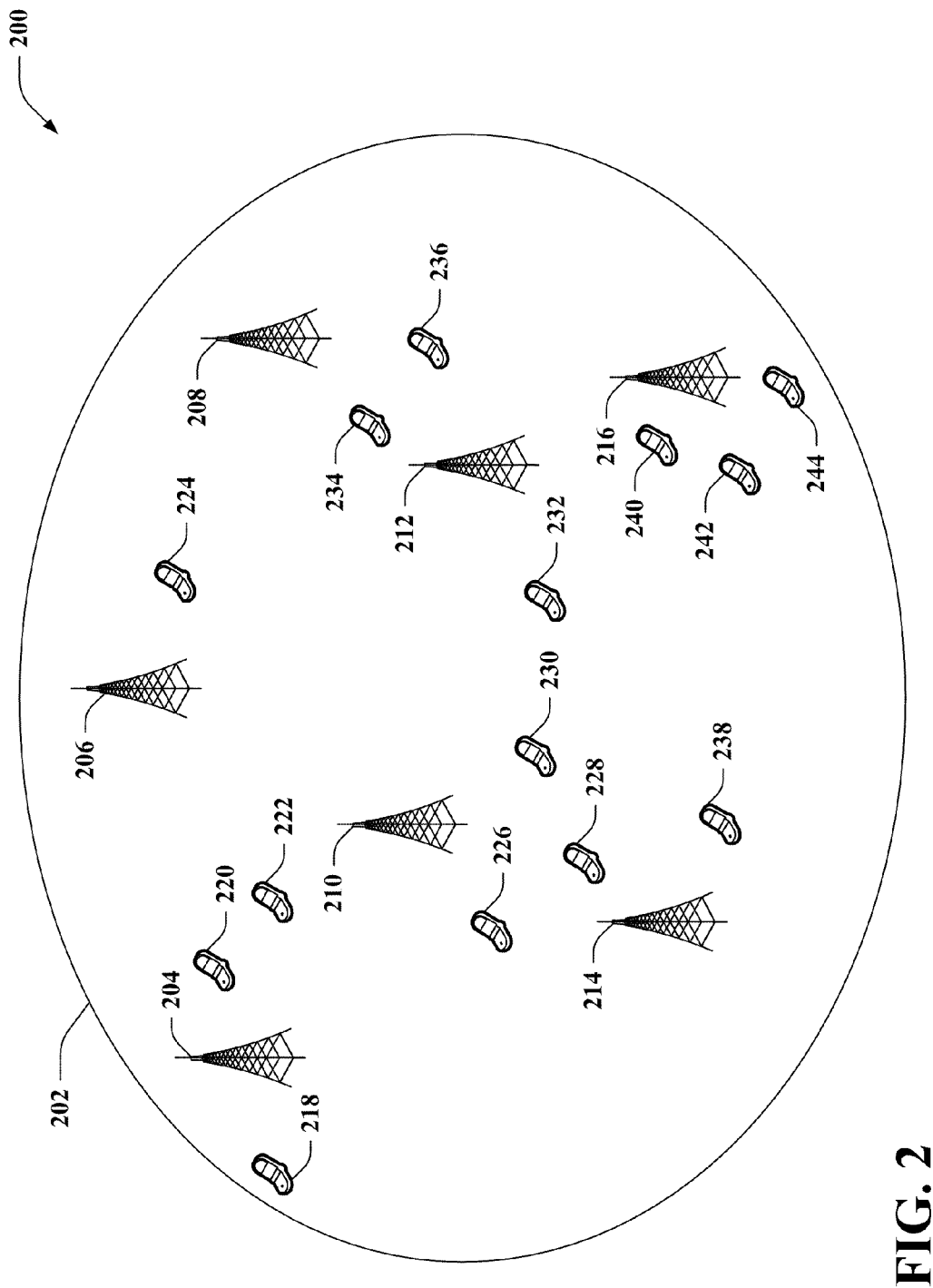
FIG. 2 is an illustration of an example system that leverages a downlink cooperation framework that employs a network-wide strategy where a set of base stations in a deployment cooperatively operate.

Now turning to FIG. 2, illustrated is an example system 200 that leverages a downlink cooperation framework that employs a network-wide strategy 202 where a set of base stations in a deployment cooperatively operate. As depicted, system 200 includes a set of base stations 204-216 and a set of mobile devices 218-244. It is contemplated, however, that system 200 can include substantially any number of base stations and/or substantially any number of mobile devices and is not limited to the illustrated example.

As shown, network-wide strategy 202 can cover all base stations 204-216 and all mobile devices 218-244 in the deployment. Thus, base stations 204-216 can cooperate to yield a scheduler decision where each base station 204-216 can be involved in data transmission to each mobile device 218-244. For instance, the set of base stations 204-216 can be scheduled to transmit to a particular mobile device 218-244, a subset of base stations 204-216 can be scheduled to transmit to a particular mobile device 218-244, and so forth. Further, scheduler decisions can be based upon a utility metric. For example, the utility metric can be a function of weighted rates that can be achieved for different mobile devices 218-244.

A strategy S can be defined as a set of base stations (e.g., nodes, cells, . . . ), mobile devices, underlying antenna weights and power spectral densities (PSDs) at base stations that serve mobile devices covered by the strategy S. The set of base stations covered by strategy S can be referred to as N(S) and the set of mobile devices covered by strategy S can be referred to as Y(S). Moreover, a rate achieved by a mobile device y under strategy S at time t per allocated resource can be $R_{y,t}(S)$, a utility metric associated with strategy S at time t can be $U_t(s)$, and a (relative) priority of mobile device y at time t based on, for instance, quality of service (QoS), fairness, etc. can be $p_{y,t}$. For example, fairness can be supported by $p_{y,t}$ being inversely proportional to an amount of data that mobile device y has received. According to an example, the utility metric can be evaluated as follows:

$$U_t(S) \triangleq \sum_{y \in Y(S)} p_{y,t} R_{y,t}(S).$$

Referring again to system 200, the set of base stations covered by network-wide strategy 202, N(S 202), includes base stations 204-216 and the set of mobile devices covered by network-wide strategy 202, Y(S 202), includes mobile devices 218-244. At a time t, however, scheduling decisions aimed at maximizing the utility metric $U_t$(S 202) for network-wide strategy 202 can be overly complex due to the number of base stations 204-216 and mobile devices 218-244 covered thereby. Moreover, it can be impractical and unneeded to involve all base stations 204-216 in system 200 when serving each mobile device 218-244 in system 200 (e.g., a given mobile device can be impacted by a finite number of base station(s) from system 200, . . . ).

Figure 3:
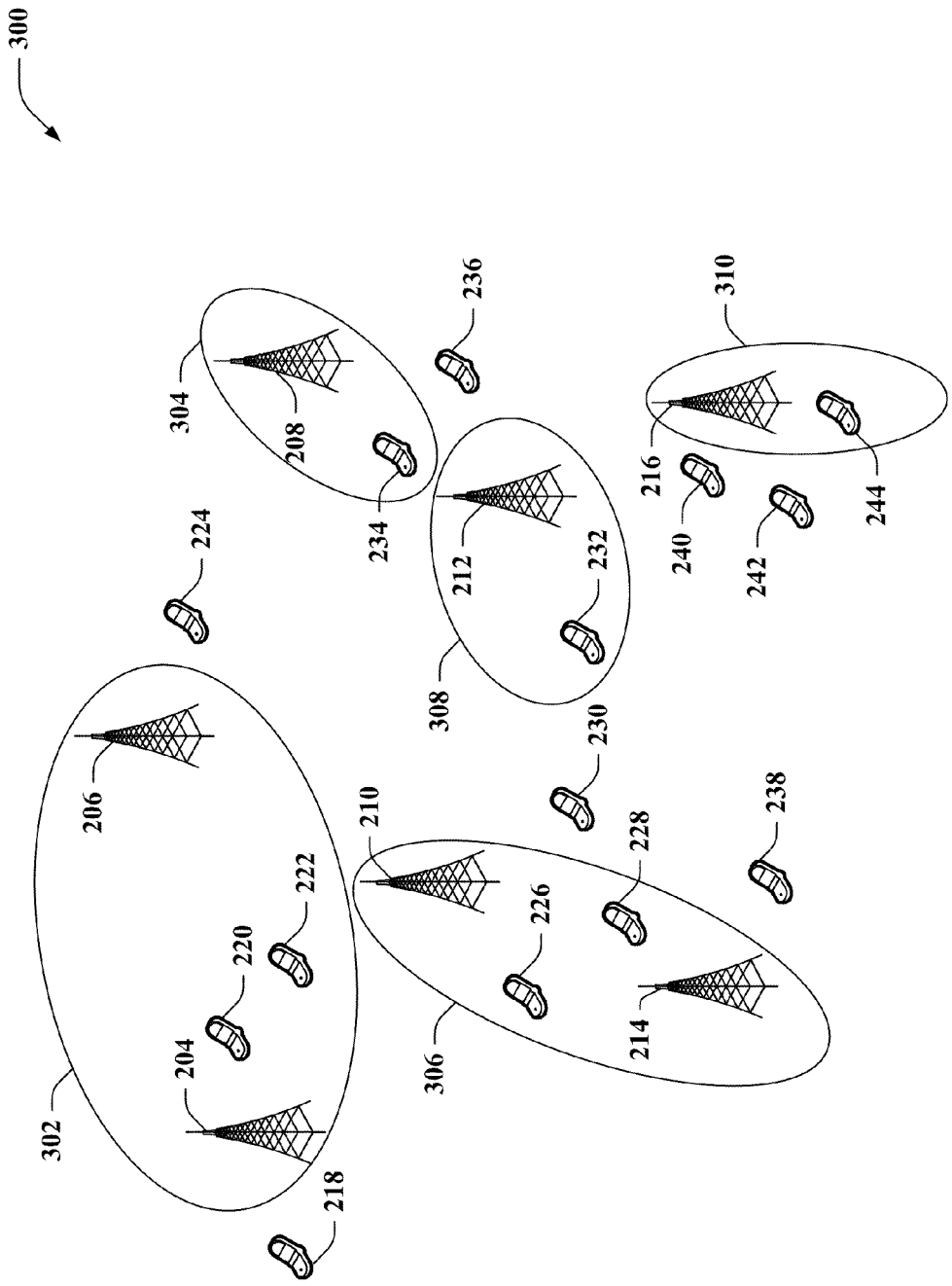
FIG. 3 is an illustration of an example system that employs dynamic clustering based upon a finite order strategy constraint in a wireless communication environment.

Now turning to FIG. 3, illustrated is an example system 300 that employs dynamic clustering based upon a finite order strategy constraint in a wireless communication environment. Similarly to the example shown in FIG. 2, system 300 can include base stations 204-216 and mobile devices 218-244; yet, it is to be appreciated that substantially any number of base stations and/or mobile devices can be included in system 300. In contrast to the example of FIG. 2 where network-wide strategy 202 encompassing base stations 204-216 and mobile devices 218-244 is leveraged, which results in complex scheduling decisions, system 300 dynamically forms a plurality of smaller, local strategies 302-310. Thus, system 300 can include a union of smaller, disjoint strategies 302-310, each with a limited maximum order. Local strategies 302-310 can be manageable in terms of association and spatial processing complexity. Moreover, intuitively a globally optimal strategy can include a large number of finite order strategies (e.g., strategies 302-310, limited order local strategies, . . . ) since high gain long loops on base stations and mobile devices can be infrequent.

At any point in time (e.g., for a particular subframe, . . . ), an optimized set of local strategies 302-310 leveraged in system 300 can be dynamically defined (e.g. to yield optimal network-wide utility, . . . ) to set forth a plurality of groups of cooperating base station(s) and corresponding mobile device(s) to be served thereby. Hence, FIG. 3 illustrates the set of local strategies 302-310 dynamically selected for a particular time. As shown for the particular time, local strategy 302 can cover base stations 204 and 206 and mobile devices 220 and 222, local strategy 304 can cover base station 208 and mobile device 234, local strategy 306 can cover base stations 210 and 214 and mobile devices 226 and 228, local strategy 308 can cover base station 212 and mobile device 232, and local strategy 310 can cover base station 216 and mobile device 244. At a different time, a differing optimized set of local strategies, each covering a corresponding subset of base stations 204-216 and corresponding subset of mobile devices 218-244, can be chosen.

Local strategies 302-310 can each correspond to a cluster including a limited number of base station(s) (e.g., from the set of base stations 204-216, ...) and mobile device(s) (e.g., from the set of mobile devices 218-244, ...). Further, each of the clusters can effectuate its own scheduling. Base stations included in a common cluster can be scheduled to effectuate various cooperation techniques as described herein.

A strategy order can be defined as a number of base stations involved in a given strategy (e.g., local strategy, ...). For instance, strategy order can be referred to as $|N(S)|$ (e.g., cardinality of the set $N(S)$, number of members of the set $N(S)$, ...), and $|N(S)|$ can be a member of a set $\{1, \ldots, X_S\}$ (e.g., $|N(S)| \in \{1, \ldots, X_S\}$, ...). Further, $X_S$ is a maximum order that can be allowed in system 300. According to an example, $X_S$ can be 3. By way of another example, $X_S$ can be 2. Yet, it is to be appreciated that $X_S$ can be any integer greater than 3 and is not limited to the aforementioned examples. As shown, local strategies 304, 308, and 310 can each include one respective base station, and thus, can be first order strategies. Moreover, local strategies 302 and 306 can each include two respective base stations, and hence, can be second order strategies. It is to be appreciated, however, that system 300 can also support third order strategies (or higher order strategies) dependent upon a value of $X_S$.

A first order strategy (e.g., local strategy 304, local strategy 308, local strategy 310, ...) can be similar to a classic wireless communication model that lacks coordination between base stations. Hence, a mobile device included in a first order strategy can be served by a base station included in the first order strategy. In contrast, a second order strategy (e.g., local strategy 302, local strategy 306, ...) can leverage cooperation between base stations included in such strategy. Thus, mobile devices covered by a second order strategy can be served by two base stations included in the second order strategy in a cooperative manner.

According to an example, second order strategy 302 can include two base stations 204 and 206, each of which can respectively have one transmit antenna. Mobile devices 220 and 222 covered by second order strategy 302 can be cooperatively served by the two base stations 204 and 206. Hence, virtual MIMO can be carried out within second order strategy 302, effectively treating the two base stations 204 and 206 as one base station with two antennas, by leveraging the two transmit antennas associated with the two base stations 204 and 206. However, it is to be appreciated that the claimed subject matter is not limited to the foregoing example.

Second order strategies and higher order strategies can enable base stations to pool together resources, antennas, and the like. Further, such strategies can allow for joint scheduling handled by base stations included in a common local strategy. Moreover, information can be shared between base stations in the common local strategy. For instance, the shared information can include channel information (e.g., for channel(s) between base station(s) and mobile device(s) in the local strategy, ...), packets (e.g., to be transmitted from one or more base stations in the local strategy, ...), and so forth. Hence, within each local strategy 302-310, base station(s) and/or mobile device(s) can cooperate with each other (e.g., to yield coordinated scheduling decisions, ...); yet, base station(s) and/or mobile device(s) need not cooperate with base station(s) and/or mobile device(s) included in differing local strategies 302-310 (e.g. cooperation need not extend across local strategies 302-310, ...). Further, each local strategy 302-310 can assess interference caused by other local strategies 302-310 and/or attempt to mitigate an impact of such interference.

An overall strategy S within system 300 can be a direct sum of local strategies, where strategy order of the local strategies can be constrained to a maximum value (e.g., $$S = \bigoplus_l S_l \text{ with } |N(S_l)| \leq X_S$$

where l is a local strategy index, ...). For example, each base station can be included in at most only one local strategy at a given time; thus, an intersection of a set of base stations covered by a first local strategy (e.g. with an index l, ...) and a set of base stations covered by a second local strategy (e.g., with an index l' for all differing l and l', ...) at a given time is an empty set ($\phi$) (e.g., $N(S_l) \cap N(S_{l'}) = \phi \forall l \neq l'$, ...). Moreover, an overall utility at a given time t can be a sum of utilities corresponding to the local strategies at the given time t (e.g., $$U_t(S) = \sum_l U_t(S_l), \ldots ).$$

Each of the utilities corresponding to the local strategies can be evaluated as:

$$U_t(S_l) = \sum_{y \in Y(S_l)} p_{y,t} R_{y,t}(S_l).$$

It is to be appreciated, however, that the claimed subject matter is not limited to the foregoing example, and rather, it is contemplated that, pursuant to another example, a base station can concurrently be included in more than one local strategy.

Subsets of base stations 204-216 and subsets of mobile devices 218-244 are dynamically grouped over time to yield the time varying set of local strategies 302-310. In contrast, conventional techniques that allow grouping of base stations typically define static clusters, which remain constant over time (e.g. the same base stations are grouped together over time, ...). Since system 300 leverages dynamic clustering, various conditions such as positioning of mobile devices 218-244, buffer levels of mobile devices 218-244, channel conditions between base station(s) 204-216 and mobile device(s) 218-244, and the like can be considered when forming local strategies 302-310 at a given time. Further, at a next time, a differing set of local strategies can be formed (e.g., depending on changes to the various conditions within system 300, ...). Thus, for example, while local strategy 302 includes base stations 204 and 206 and mobile devices 220 and 222 at a particular time in the depicted example of FIG. 3, at a next time a local strategy can be selected that includes base stations 204 and 210 and mobile devices 220 and 222, while base station 206 can be covered by a differing local strategy. Moreover, following this example, at a further subsequent time, a local strategy can be chosen that groups base station 204 and mobile device 218, while base stations 206 and 210 and mobile devices 220 and 222 can be included in one or more differing local strategies. However, it is to be appreciated that the claimed subject matter is not limited to the foregoing example.

Figure 4:
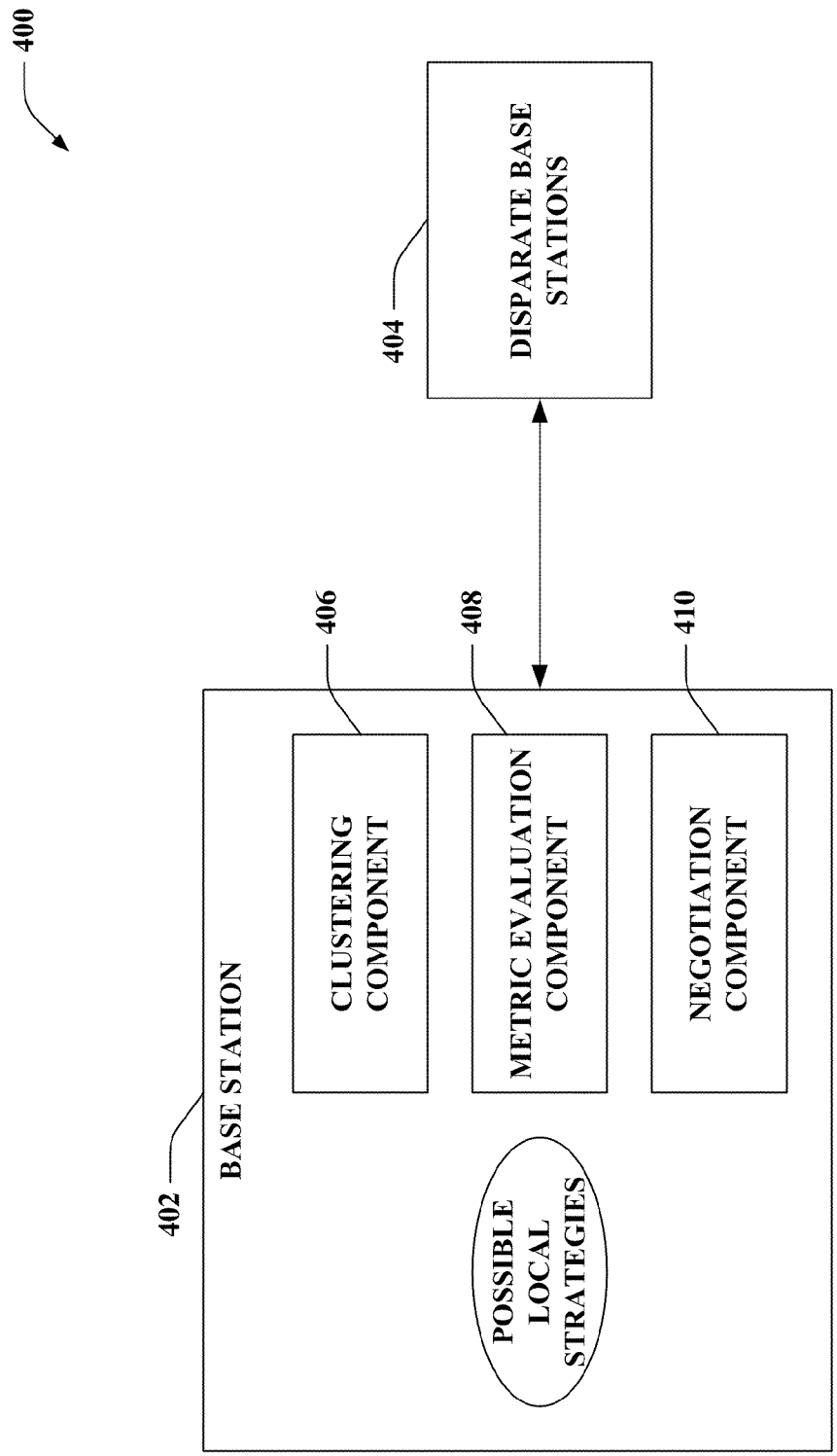
FIG. 4 is an illustration of an example system that employs distributed strategy negotiation in a wireless communication environment.

Referring to FIG. 4, illustrated is a system 400 that employs distributed strategy negotiation in a wireless communication environment. System 400 includes a base station 402 and a plurality of disparate base stations 404. Further, although not shown, it is contemplated that system 400 can include substantially any number of mobile devices. Base station 402 can interact with at least a subset of disparate base stations 404 to transmit and/or receive information, signals, data, instructions, commands, bits, symbols, and the like. Moreover, based upon the interaction, base station 402 and disparate base stations 404 can each select a respective local strategy to implement from a respective set of possible local strategies. Base station 402 and disparate base stations 404 can converge to a compatible set of local strategies across system 400 that yield clusters which are non-overlapping.

Base station 402 can further include a clustering component 406, a metric evaluation component 408, and a negotiation component 410. Similarly, although not shown, it is contemplated that disparate base stations 404 can each likewise include a respective clustering component (e.g., similar to clustering component 406, . . . ), a respective metric evaluation component (e.g., similar to metric evaluation component 408, . . . ), and a respective negotiation component (e.g., similar to negotiation component 410, . . . ).

Clustering component 406 can dynamically select a local strategy to implement with base station 402 from the set of possible local strategies. For instance, clustering component 406 can choose to form a cluster with a particular one (or subset) of disparate base stations 404 at a given time based upon the selected local strategy. Moreover, one or more mobile devices can be included in the cluster corresponding to the selected local strategy at the given time. Further, at a next time, clustering component 406 can, but need not, elect to utilize a differing local strategy from the set of possible local strategies. Moreover, each of disparate base stations 404 can similarly dynamically select a respective local strategy to leverage as a function of time. Thus, system 400 supports effectuating a fully distributed strategy determination, where each base station (e.g. base station 402, each of disparate base stations 404, . . . ) can evaluate possible local strategies in which the base station can be involved to select a particular local strategy for the base station at a given time.

For each base station to select the particular local strategy to implement at a given time, each base station can evaluate a metric. More particularly, metric evaluation component 408 (and similar metric evaluation components of disparate base stations 404) can evaluate marginal utilities (e.g., local utilities, . . . ) of possible local strategies in which base station 402 can cooperate with neighbor base stations (e.g., one or more of disparate base stations 404, . . . ). A marginal utility (e.g., local utility, . . . ) analyzed by metric evaluation component 408 can be a utility of a local strategy in isolation from a remainder of a network. Moreover, neighbor base stations and base station 402 can share channel state information (CSI) and/or information concerning priority of common mobile devices; the shared information can be used by metric evaluation component 408 (and similar metric evaluation components of disparate base stations 404) to effectuate analyzing the marginal utilities (e.g., local utilities, . . . ).

Further, upon metric evaluation component 408 yielding the marginal utilities (e.g., local utilities, . . . ) associated with the possible local strategies, negotiation component 410 can employ message passing to agree on a compatible set of local strategies (e.g., marginal strategies, . . . ) across system 400. For instance, message passing can be effectuated across base stations in system 400 (e.g. base station 402 and disparate base stations 404, . . . ). Moreover, base stations in system 400 can exchange strategy and utility information with respective neighbors through message passing. By way of example, base station 402 can exchange strategy and utility information with its neighbor base stations (e.g., subset of disparate base stations 404, . . . ). Moreover, it is contemplated that the message passing can be iterative; however, the claimed subject matter is not so limited. Message passing can be implemented in system 400 to enable each base station to compute an estimate of an overall network-wide utility associated with a particular marginal strategy (e.g. particular local strategy from the set of possible local strategies associated with the base station, . . . ). Moreover, message passing effectuated in system 400 can be analogous to message passing decoding, wherein iterations lead to a symbol-wise metric that can reflect value and reliability of a bit within a globally optimal solution. Further, utility based quantities for inter-base station exchange can be generalized to account for additional (practical) constraints such as backhaul quality, preferred cooperation technique(s), and the like.

Negotiation component 410 can enable base station 402 to transmit utility information to and received utility information from neighbor base stations (e.g., subset of disparate base stations 404, . . . ). By exchanging utility information, base station 402 and disparate base stations 404 can converge to a set of clusters to be employed in system 400 (e.g., by base station 402 and disparate base stations 404 each selecting respective local strategies that maximize overall network-wide utility, . . . ), where the clusters in the set are non-contradictory (e.g., at any point in time on any resource the clusters are non-overlapping, . . . ). Pursuant to an example, if clustering component 406 of base station 402 selects a local strategy (e.g., second order local strategy, . . . ) at a given time where base station 402 and a specific one of disparate base stations 404 are clustered, then the specific one of disparate base stations 404 (e.g., disparate clustering component thereof, . . . ) elects a local strategy (e.g., second order local strategy, . . . ) at the given time where the specific one of disparate base stations 404 and base station 402 are clustered while remaining disparate base stations 404 do not select respective local strategies that involve base station 402 or the specific one of disparate base stations 404 at the given time.

Base station 402 and disparate base stations 404 can enable controlling the set of local strategies chosen to be utilized in system 400 in a distributed fashion rather than employing a centralized controller. Base station 402 and disparate base stations 404 can each consider respective sets of possible local strategies (e.g., base station 402 can analyze utilities associated with each of the possible local strategies using metric evaluation component 408, disparate base stations 404 can similarly evaluate utilities, . . . ). Moreover, message passing can be effectuated (e.g., with negotiation component 410 and similar negotiation components of disparate base stations 404, . . . ) to exchange utility information between neighbors, which can lead to base station 402 and disparate base stations 404 forming a convergent solution across system 400 at a given time.

Due to the exchange of utility information effectuated by negotiation component 410, metric evaluation component 408 can yield an estimate of network-wide utility for the possible local strategies in which base station 402 can be involved. Thus, metric evaluation component 408 can compute weighted sum rates of mobile devices that are involved in each of the possible local strategies as well as estimate overall sum rates across an entire network conditioned on the fact that each of the possible local strategies are employed by base station 402. Hence, base station 402 and disparate base stations 404 can each estimate network-wide utility conditioned upon each possible local strategy the base stations can respectively leverage.

Figure 5:
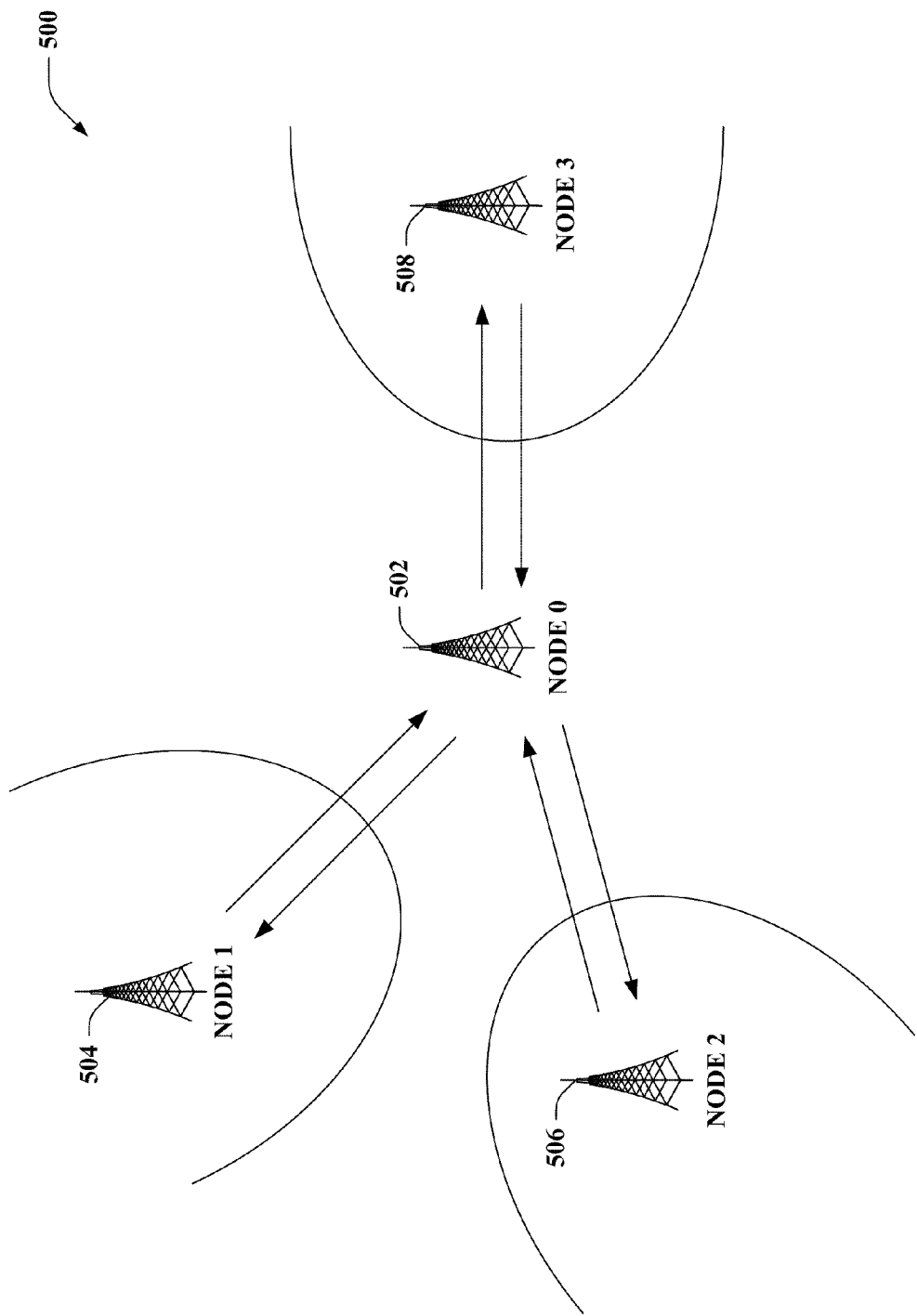
FIG. 5 is an illustration of an example system that employs message passing in a wireless communication environment.

Turning to FIG. 5, illustrated is an example system 500 that employs message passing in a wireless communication environment. System 500 includes a node 0 502 and three nodes 504, 506, and 508 (e.g., node 1 504, node 2 506, and node 3 508, . . . ) that neighbor node 0 502. Nodes 502-508 can also be referred to as base stations 502-508. Further, each node 502-508 can be substantially similar to base station 402 of FIG. 4.

By way of example, node 0 502 can cooperate with one of node 1 504, node 2 506, or node 3 508 (e.g., a constraint can be utilized within system 500 to limit a number of nodes 502-508 and mobile devices that can be included within a common cluster, assuming that a maximum order strategy supported in system 500 is two, . . . ). For instance, cooperation between node 0 502 and node 1 504 can result in a certain local utility, which is a weighted sum rate across mobile devices served by such local strategy. Further, if node 0 502 cooperates with node 1 504, then node 0 502 can be unable to cooperate with node 2 506 or node 3 508. Based upon a measure of local utility (e.g., yielded by metric evaluation component 408 of FIG. 4, . . . ), node 0 502 can recognize that cooperation with node 1 504 yields a higher local utility in comparison to cooperation with node 2 506 or node 3 508; however, cooperation between node 0 502 and node 1 504 can be detrimental to overall network-wide utility as compared to node 0 502 operating under a differing local strategy. Thus, message passing can be employed to propagate messages across system 500, where such messages allow nodes 502-508 to each estimate network-wide utility conditioned upon each of the possible local strategies that each of nodes 502-508 can respectively implement. For instance, after a number of iterations, node 0 502 can estimate network-wide utility associated with each possible local strategy that can be selected by node 0 502, and node 0 502 can choose a particular local strategy with a maximum estimate of network-wide utility. Hence, the aforementioned message passing algorithm can enable converging to a global optimal solution. Moreover, nodes 502-508 can dynamically decide upon local strategies over time subject to channel conditions, mobile device conditions, and the like. It is to be appreciated, however, that the claimed subject matter is not limited to the foregoing example.

FIG. 5 shows a cooperation graph with vertices represented by nodes and edges represented by (potential) cooperation relationships. For instance, an edge can be between two nodes (e.g., node a and node b, . . . ) at a given time if there exists a common mobile device with active priorities, wherein the common mobile device receives pilots from both nodes (e.g., strengths of received pilots can be similar to an active or candidate set concept, . . . ). Thus, two nodes that have a common edge can be referred to as neighbors.

Utility information can be passed between neighbors in system 500 as part of the distributed negotiation framework described herein. For instance, node 0 502 can pass utility information to each of its neighbors (e.g., nodes 504-508, . . . ) and can receive utility information from each of its neighbors (e.g., by employing negotiation component 410 of FIG. 4, . . . ). In the examples described below, the utility information can be transmitted from node p (e.g., source node, . . . ) to node q (e.g., target node, . . . ); for instance, utility information can be sent from node 0 502 to node 1 504, from node 1 504 to node 0 502, and so forth.

According to various embodiments, extrinsic utilities transmitted from node p to node q as part of a distributed negotiation framework can include a cooperative utility value and a non-cooperative utility value. The cooperative utility value can be referred to as $U_{p,q}^{(c)}$ and the non-cooperative utility value can be referred to as $U_{p,q}^{(n)}$. The cooperative utility value transmitted from node p to node q can reflect an estimate of a total utility of a sub-graph connected to node q through node p assuming that node p is not involved in any strategy that excludes node q, hence allowing potential cooperation with node q. Further, the non-cooperative utility value transmitted from node p to node q can reflect an estimate of a total utility of a sub-graph connected to node q through node p assuming that node p is involved in a strategy that excludes node q; thus, node p potentially does not cooperate with node q. Moreover, an implicit assumption can be that sub-graphs are non-overlapping. Additionally or alternatively, this message passing algorithm can assume a lack of loops; however, the claimed subject matter is not so limited.

As part of the foregoing distributed negotiation framework, $L_p$ represents a set of indexes of all potential marginal strategies (e.g., potential local strategies, . . . ) associated with node p. Moreover, $U_{p,t}(S_l)$ can be an estimate of network-wide sum utility (NWSU) conditioned on the marginal strategy $S_l$ that involves node p computed by node p at time t. Further, l can be a member of $L_p$ (e.g $l \in L_p$, $L_p=\{1,2,3\}$ in the example shown in FIG. 5, . . . ). Accordingly, the estimate of the network-wide sum utility conditioned on a particular marginal strategy can be the sum of a utility for the marginal strategy plus a sum-utility of all sub-graphs connected via cooperative nodes plus a sum-utility of all sub-graphs connected via non-cooperative nodes, which can be represented as follows:

$$U_{p,t}(S_l) = U_t(S_l) + \sum_{m \in N(S_l)} U_{m,p}^{(c)} + \sum_{m \notin N(S_l)} U_{m,p}^{(n)}.$$

Accordingly, node p can identify an index ($l_{p,q,t}$) of a best strategy involving node p and q at time t as follows:

$$l_{p,q,t} = \arg\max_{l \in L_p, q \in N(S_l)} U_{p,t}(S_l)$$

$$U_{p,q}^{(c)} := U_{p,t}(S_{l_{p,q,t}}) - U_t(S_{l_{p,q,t}}) - U_{q,p}^{(c)}$$

$$U_{p,q}^{(c)} := \sum_{\substack{m \in N(S_{l_{p,q,t}}) \\ m \neq q}} U_{m,p}^{(c)} + \sum_{m \notin N(S_{l_{p,q,t}})} U_{m,p}^{(n)}$$

The foregoing can represent a sum utility of all sub-graphs connected to node p except sub-graphs connected through node q assuming cooperation between node p and node q. Moreover, node p can recognize an index ($l'_{p,q,t}$) of a best strategy involving node p but not node q at time t as follows:

$$l'_{p,q,t} = \arg\max_{l \in L_p, q \notin N(S_l)} U_{p,t}(S_l)$$

$$U_{p,q}^{(n)} := U_{p,t}(S_{l'_{p,q,t}}) - U_{q,p}^{(n)}$$

-continued $$U_{p,q}^{(c)} := \sum_{\substack{m \in N(S_{l_{p,q,t}}) \\ m \neq q}} U_{m,p}^{(c)} + \sum_{m \notin N(S_{l_{p,q,t}})} U_{m,p}^{(n)}$$

The above can correspond to a sum utility of all sub-graphs connected to node p except sub-graphs connected through node q assuming no cooperation between node p and node q. The utility of marginal strategy $S_l$ can be evaluated as follows:

$$U_t(S_l) = \sum_{y \in Y(S_l)} p_{y,t} R_{y,t}(S_l).$$

Further, marginal strategy selection can be effectuated according to $$l_{p,t}^* = \arg \max_{l \in L_p} U_{p,t}(S_l),$$

which can be analogous to a hard decision at an end of message passing decoding.

Below is an example extrinsic utility calculation that can be performed by node 0 502. Node 0 502 can calculate $U_{0,1}^{(c)}$ and $U_{0,1}^{(n)}$ given values of $U_{1,0}^{(c)}$, $U_{1,0}^{(n)}$, $U_{2,0}^{(c)}$, $U_{2,0}^{(n)}$, $U_{3,0}^{(c)}$, and $U_{3,0}^{(n)}$. When evaluating $U_{0,1}^{(c)}$, $S_1$ is the possible cooperative strategy between node 0 502 and node 1 504, and thus, $l_{p,q,t}=1$. It thus follows that $U_{0,1}^{(c)}=U_{0,t}(S_1)-U_t(S_1)-U_{1,0}^{(c)}$. Moreover, the estimate of network-wide sum utility conditioned on the marginal strategy $S_1$ that involves node 1 504 computed by node 0 502 can be identified as $U_{0,t}(S_1)=U_t(S_1)+U_{1,0}^{(c)}+U_{2,0}^{(n)}+U_{3,0}^{(n)}$. Hence, $U_{0,1}^{(c)}$ can equal a sum utility over a part of an overall network connected to node 1 504 through node 0 502 assuming cooperation between node 0 502 and node 1 504, where node 2 506 and node 3 508 do not cooperate with node 0 502 (e.g., $U_{0,1}^{(c)}=U_{2,0}^{(n)}+U_{3,0}^{(n)},\ldots$). Further, when node 0 502 analyzes $U_{0,1}^{(n)}$, strategies $S_2$ and $S_3$ can be options for node 0 502 assuming no cooperation with node 1 504. For instance, it can be assumed that $S_2$ is a better strategy for node 0 502 (e.g., $U_{0,t}(S_2) > U_{0,t}(S_3)$), and then $l'_{p,q,t}=2$ and $U_{0,1}^{(n)}=U_{0,t}(S_2)-U_{1,0}^{(n)}$. Moreover, the following can be yielded: $U_{0,t}(S_2)=U_t(S_2)+U_{2,0}^{(c)}+U_{1,0}^{(n)}+U_{3,0}^{(n)}$. Accordingly, $U_{0,1}^{(n)}$ can equal a sum utility over a part of an overall network connected to node 1 504 through node 0 502 assuming no cooperation between node 0 502 and node 1 504 (e.g. hence node 0 502 considers the best cooperation other than with node 1 504 which by assumption is cooperation with node 2 506 via strategy $S_2, \ldots$); thus, $U_{0,1}^{(n)}=U_t(S_2)+U_{2,0}^{(c)}+U_{3,0}^{(n)}$. It is to be appreciated, however, that the claimed subject matter is not limited to the foregoing example.

According to other embodiments, extrinsic utilities transmitted from node p to node q as part of a distributed negotiation framework can include a plurality of utility values. For instance, if node p considers T possible local strategies, then node p can send T messages, where T can be substantially any integer; yet, the claimed subject matter is not so limited. A projected utility of a strategy $S_l$ can be computed as a sum of a local utility (e.g., $U_t(S_l), \ldots$) and extrinsic utilities from neighbor nodes that are compatible with $S_l$. The extrinsic utility value transmitted from node p to node q can be referred to as $U_{p,q}^{(m)}$, which reflects the total utility of a sub-graph connected to node q through node p under constraints on node q reported to node q. Moreover, different messages m can represent different constraints on node q. For example, node p can be involved in cooperation with node q; following this example, such extrinsic utility can be added up by node q to compute projected utility of a strategy where node q cooperates with node p. By way of another example, node p can lack cooperation with node q; accordingly, the extrinsic utility can be added up by node q to compute a projected utility of a strategy where node q does not cooperate with node p. Further, the messages m can indicate nodes and/or mobile devices involved in cooperation under a particular strategy so that node q does not add up extrinsic utilities referring to any node and/or mobile device to a local utility of its own strategy that involves the same node and/or mobile device.

As part of the above noted distributed negotiation framework, $L_p$ represents a set of indexes of all potential local strategies (e.g., potential marginal strategies, . . . ) associated with node p. Moreover, $U_{p,t}(S_l)$ can be a projected network-wide sum utility (NWSU) conditioned on the local strategy $S_l$ that involves node p computed by node p at time t. Further, l can be a member of $L_p$ (e.g., $l \in L_p$, $L_p=\{1,2,3\}$ in the example shown in FIG. 5, . . . ). Accordingly, a projection of a network-wide sum utility conditioned on a particular local strategy $S_l$ can be calculated as follows:

$$U_{p,t}(S_l) = U_t(S_l) + \sum_q \max_{1 \leq m \leq M_q} \xi^{(m)}(S_{l,q,p}) U_{q,p}^{(m)}.$$

$M_q$ can represent a total number of messages passed from node q to node p, $U_{q,p}^{(m)}$ can represent the m-th extrinsic utility received from node q, and $\xi^{(m)}(S_{l,q,p})$ can be a compatibility verification for the m-th message from node q to node p with strategy $S_l$ which can have a value of 0 or 1. Further, local strategy selection can be effectuated according to $$l_{p,t}^* = \arg\max_{l \in L_p} U_{p,t}(S_l),$$

which can be analogous to a hard decision at an end of message passing decoding.

The total number of messages $M_q$ can match a number of constraints corresponding to possible local strategies of a target node. For instance, for each common neighbor of a source node and a target node, a message can be added that corresponds to no cooperation between the source node and that common neighbor (e.g., a number of common neighbors equals a number of messages, . . . ). By way of another illustration, messages that correspond to cooperation with one common neighbor and non-cooperation with another common neighbor can be considered if second order or higher strategies are leveraged (e.g., a number of messages equals the number of common neighbors multiplied by the number of common neighbors minus one where the product can be divided by two, . . . ). Further, a message that does not involve any common neighbors can yield no constraints on a target node, and thus, can be used with any non-cooperation strategy. Moreover, it can be unnecessary to use multiple messages under a common set of constraints; rather, the source (or target) node can select a message with a highest utility under the given constraints. Pursuant to an example, extrinsic messages chosen for sending can include one message that does not involve the target or any common neighbors (e.g., identified via knowledge of a common neighbor list, . . . ) and remaining messages selected with maximum extrinsic utilities; yet, it is to be appreciated that the claimed subject matter is not so limited.

Below are example projected utility calculations that leverage the above noted plurality of extrinsic utilities. It is to be appreciated, however, that the claimed subject matter is not so limited.

According to an illustration, each node p (e.g., node 1 504, node 2 506, node 3 508, . . . ) can have one possible constraint for node 0 502, namely that node 0 502 is involved in cooperation with node p, where $1 \leq p \leq 3$ for system 500. Hence, node p can send the following two messages to node 0 502: $U_{p,0}^{(1)}$ which is conditioned on node p cooperating with node 0 502 and $U_{p,0}^{(2)}$ which is conditioned on node p not cooperating with node 0 502. For instance, node 0 502 can support three possible local strategies (e.g., $S_1$ where node 0 502 can be clustered with node 1 504, $S_2$ where node 0 502 can be clustered with node 2 506, or $S_3$ where node 0 502 can be clustered with node 3 508, . . . ). Thus, node 0 502 can evaluate projected network-wide sum utilities for each of the three possible local strategies per the below:

$$U_{0,t}(S_1) = U_t(S_1) + U_{1,0}^{(1)} + U_{2,0}^{(2)} + U_{3,0}^{(2)}$$

$$U_{0,t}(S_2) = U_t(S_2) + U_{1,0}^{(2)} + U_{2,0}^{(1)} + U_{3,0}^{(2)}$$

$$U_{0,t}(S_3) = U_t(S_3) + U_{1,0}^{(2)} + U_{2,0}^{(2)} + U_{3,0}^{(1)}$$

Moreover, node 0 502 can compute extrinsic utilities, which can be transmitted to a target neighboring node (e.g. node 1 504, node 2 506, node 3 508, . . . ). The extrinsic utility passed to the target neighboring node can represent a fraction of a network-wide utility that excludes utility of the target neighboring node and other nodes connected to a source node (e.g., node 0 502, . . . ) through the target. This can imply a loop-less network graph, where a node has at most one path to another node. Although loop-less graphs typically don't exist, belief propagation algorithms can be designed under such assumption (e.g., short loops can have more impact than long loops, there can be fewer short(er) loops compared to long(er) loops, . . . ).

For a set $\Omega_{p,q}^{(m)}$ of nodes that can cooperate with node q decided by node p for a message m to be sent to node q, a strategy that maximizes projected utility under the stated constraints can be evaluated as follows:

$$l^* = \arg\max_{l \in L_p: N(S_l) \cap \Omega_{p,q}^{(m)} = \phi} U_{p,t}(S_l).$$

Moreover, the extrinsic utility for the target node q can be obtained as this projected utility less the extrinsic contribution to this utility from the target node q, as shown below:

$$U_{p,q}^{(m)} = U_t(S_{l^*}) + \sum_{q' \neq q} \max_{1 \leq m \leq M_{q'}} \xi^{(m)}(S_{l^*}, q', p) U_{q',p}^{(m)}$$

In general, the source node p can compute and send to the target node q multiple extrinsic utilities $U_{p,q}^{(m)}$ corresponding to different sets $\Omega_{p,q}^{(m)}$. Although at least one message can be used for every possible set $\Omega_{p,q}^{(m)}$, the total number of messages passed from node p to node q can be pruned without much loss in performance. For example, pruning can be accomplished by selecting a limited number of messages with the largest values of corresponding projected utilities.

According to the above illustration with one constraint, node 1 504 can have one possible constraint for node 0 502, namely that node 1 504 is involved in cooperation with node 0 502. Thus, node 0 502 sends two messages to node 1 504: $U_{0,1}^{(1)}$ which corresponds to node 1 504 cooperating with node 0 502 and $U_{0,1}^{(2)}$ which corresponds to node 1 504 not cooperating with node 0 502. Node 0 502 can evaluate the extrinsic utilities as follows:

$$U_{0,1}^{(1)} = 0$$

If $U_{0,t}(S_2) > U_{0,t}(S_3)$, then $$U_{0,1}^{(2)} = U_t(S_2) + U_{2,0}^{(1)} + U_{3,0}^{(2)} = U_{0,t}(S_2) - U_{1,0}^{(2)}$$

Else, $$U_{0,1}^{(2)} = U_t(S_3) + U_{2,0}^{(2)} + U_{3,0}^{(1)} = U_{0,t}(S_3) - U_{1,0}^{(2)}$$

Figure 6:
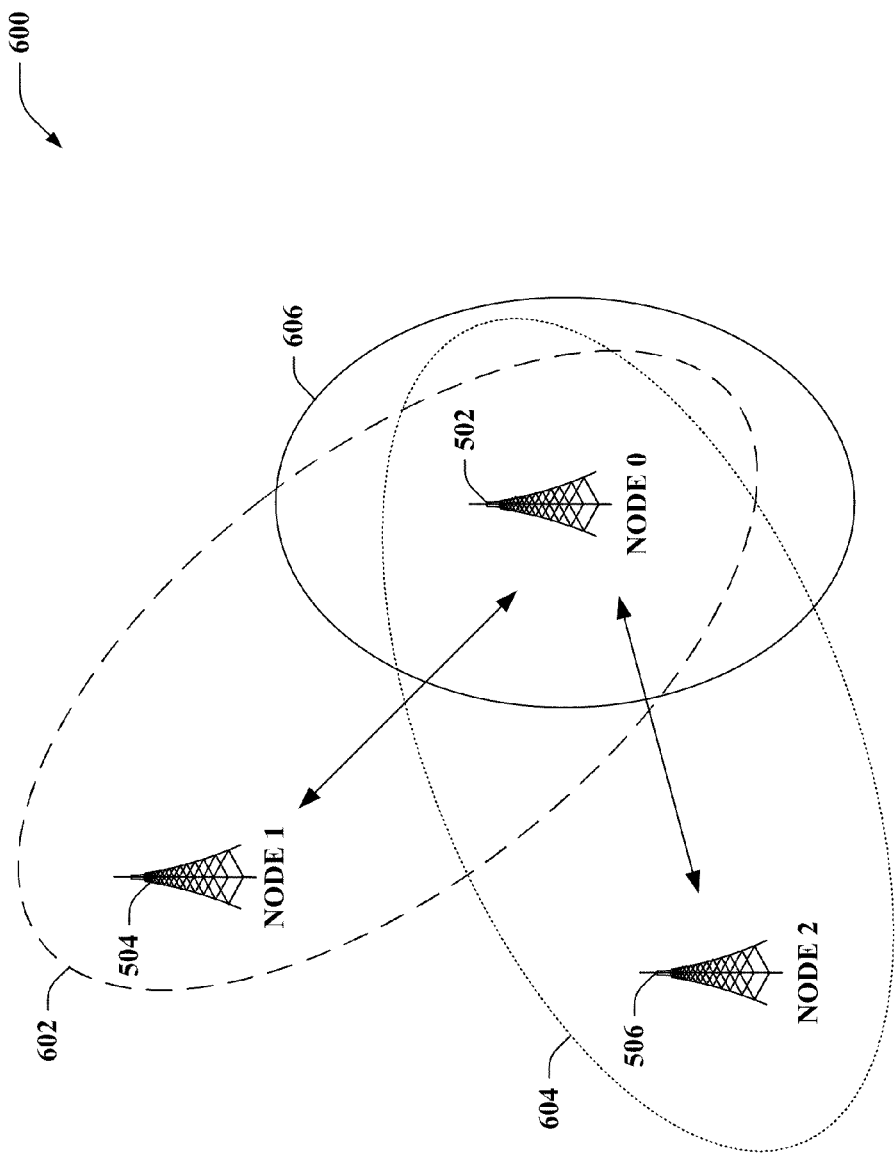
FIG. 6 is an illustration of another example system that employs message passing in a wireless communication environment.

FIG. 6 depicts another system 600 that employs message passing in a wireless communication environment. As shown, node 0 502 can evaluate three possible local strategies: $S_1$ 602 where node 0 502 and node 1 504 are clustered (e.g., cooperate, . . . ), $S_2$ 604 where node 0 502 and node 2 506 are clustered (e.g., cooperate, . . . ), and $S_3$ 606 where node 0 502 does not cooperate with either node 1 504 or node 2 506. Moreover, node 1 504 and node 2 506 can be neighbors of each other. By way of another illustration, each node p (e.g., node 1 504, node 2 506, . . . ) can have two constraints for node 0 502. The two constraints can be cooperation with node 0 502 and cooperation with another neighbor of node 0 502. Hence, node p can sent three messages to node 0 502: $U_{p,0}^{(1)}$ which is conditioned on node p cooperating with node 0 502, $U_{p,0}^{(2)}$ which is conditioned on node p cooperating with a neighbor node q of node 0 502 (e.g., q=2 for p=1, q=1 for p=2, . . . ), and $U_{p,0}^{(3)}$ which is conditioned on node p not cooperating with node 0 502 or a neighbor of node 0 502. Thus, node 0 502 can evaluate projected network-wide sum utilities for each of the three possible local strategies 602-606 as follows:

$$U_{0,t}(S_1) = U_t(S_1) + U_{1,0}^{(1)} + U_{2,0}^{(3)}$$

$$U_{0,t}(S_2) = U_t(S_2) + U_{1,0}^{(3)} + U_{2,0}^{(1)}$$

$$U_{0,t}(S_3) = U_t(S_3) + \max\{U_{1,0}^{(2)}, U_{1,0}^{(3)}\} + \max\{U_{2,0}^{(2)}, U_{2,0}^{(3)}\}$$

Further, node 0 502 can compute extrinsic utilities, which can be sent to a target neighboring node (e.g., node 1 504, node 2 506, . . . ). According to the above illustration with two constraints, node 1 504 can have two possible constraints for node 0 502, namely that node 1 504 is involved in cooperation with node 0 502 and that node 1 504 is involved in cooperation with node 2 506 (e.g., which is also a neighbor of node 0 502, . . . ). Thus, node 0 502 sends three messages to node 1 504: $U_{0,1}^{(1)}$ which corresponds to node 1 504 cooperating with node 0 502, $U_{0,1}^{(2)}$ which corresponds to node 1 504 cooperating with node 2 506, and $U_{0,1}^{(3)}$ which corresponds to node 1 504 cooperating with neither node 0 502 nor node 2 506. Node 0 502 can evaluate the extrinsic utilities as follows:

$$U_{0,1}^{(1)} = 0$$

$$U_{0,1}^{(2)} = U_t(S_3) + \max\{U_{2,0}^{(2)}, U_{2,0}^{(3)}\} = U_{0,t}(S_3) - \max\{U_{1,0}^{(2)}, U_{1,0}^{(3)}\}$$

If $U_{0,t}(S_2) > U_{0,t}(S_3)$, then $$U_{0,1}^{(3)} = U_t(S_2) + U_{2,0}^{(1)} = U_{0,t}(S_2) - U_{0,1}^{(3)}$$

Else, $$U_{0,1}^{(3)} = U_{0,1}^{(2)}$$

Figure 7:
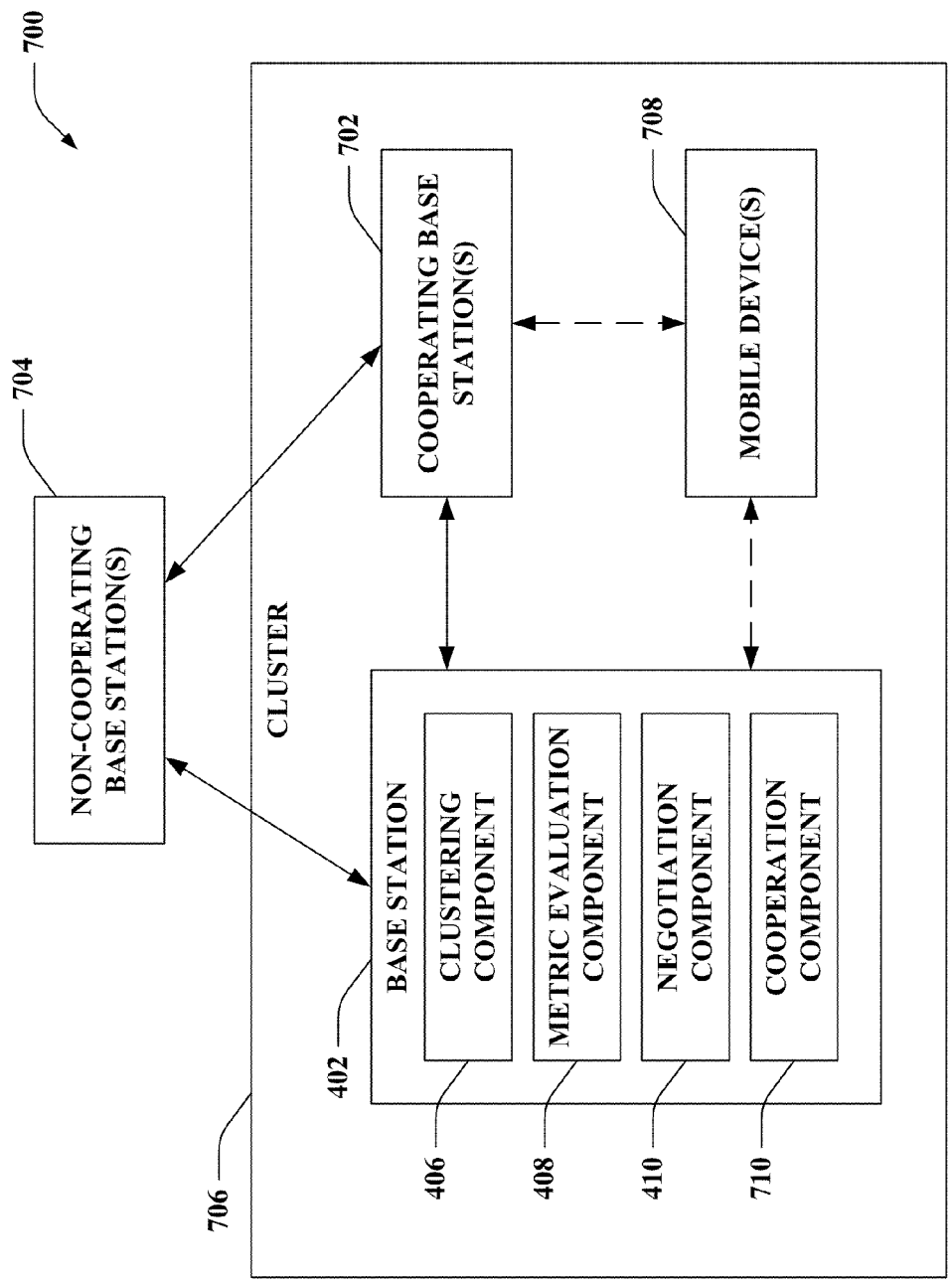
FIG. 7 is an illustration of an example system that supports cooperation within clusters in a wireless communication environment.

Now turning to FIG. 7, illustrated is a system 700 that supports cooperation within clusters in a wireless communication environment. System 700 includes base station 402, cooperating base station(s) 702, and non-cooperating base station(s) 704 (e.g., cooperating base station(s) 702 and non-cooperating base station(s) 704 can each be substantially similar to base station 402, ... ). For instance, cooperating base station(s) 702 and non-cooperating base station(s) 704 can be disparate base stations 404 of FIG. 4. As described herein, at a given time, base station 402 and cooperating base station(s) 702 can dynamically form a cluster 706. Thus, base station 402 and cooperating base station(s) 702 can cooperate with each other at the given time; meanwhile, at the given time, base station 402 and cooperating base station(s) 702 do not cooperate with non-cooperating base station(s) 704. Moreover, non-intersecting subsets of non-cooperating base station(s) 704 can similarly form respective, non-overlapping clusters in which cooperation can be effectuated. Further, cluster 706 can include mobile device(s) 708, which are served by base station 402 and cooperating base station(s) 702. Likewise, although not shown, system 700 can include mobile devices not included in cluster 706 that are each covered by a respective one of the non-overlapping clusters dynamically formed by the non-cooperating base station(s) 704 at the given time.

As described herein, base station 402 can leverage clustering component 406, metric evaluation component 408, and negotiation component 410 to dynamically select to cooperate with cooperating base station(s) 702 at the given time in a distributed manner. Moreover, base station 402 can include a cooperation component 710 that can coordinate operation of base station 402 and cooperating base station(s) 702 to effectuate one or more cooperation techniques. Hence, upon forming cluster 706, cooperation component 710 (and similar cooperation component(s) of cooperating base station(s) 702) can control operations within cluster 706 to take advantage of cooperation there between.

Figure 8:
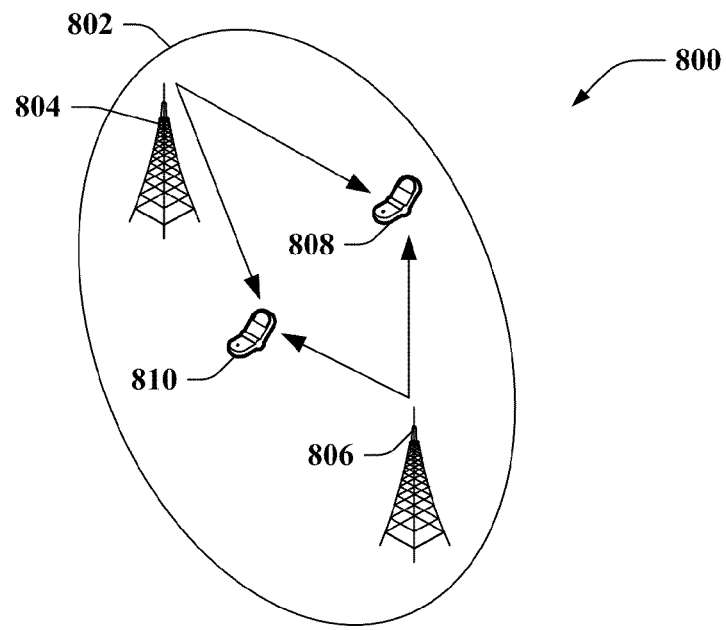
FIG. 8 is an illustration of an example system that employs inter-site packet sharing (ISPS) (e.g., coherent ISPS, . . . ) within a cluster in a wireless communication environment.
Figure 9:
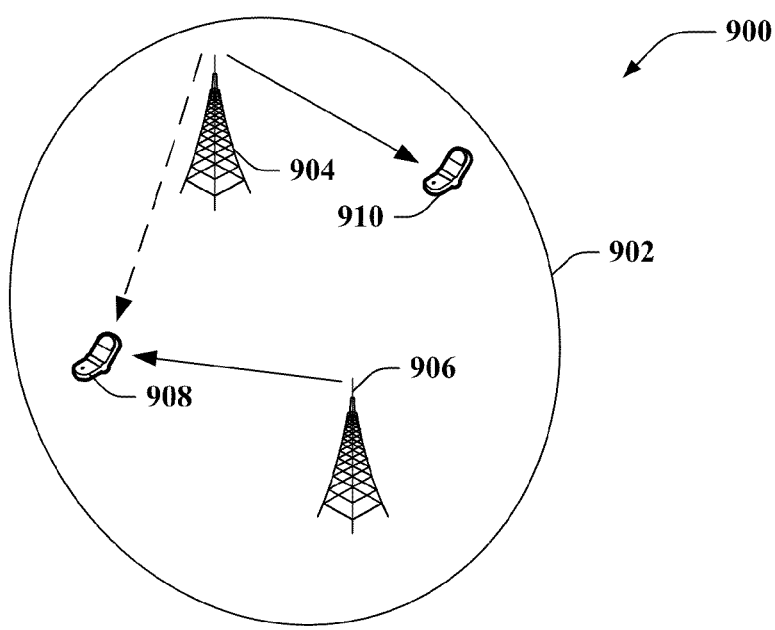
FIG. 9 is an illustration of an example system that implements cooperative beamforming within a cluster in a wireless communication environment.
Figure 10:
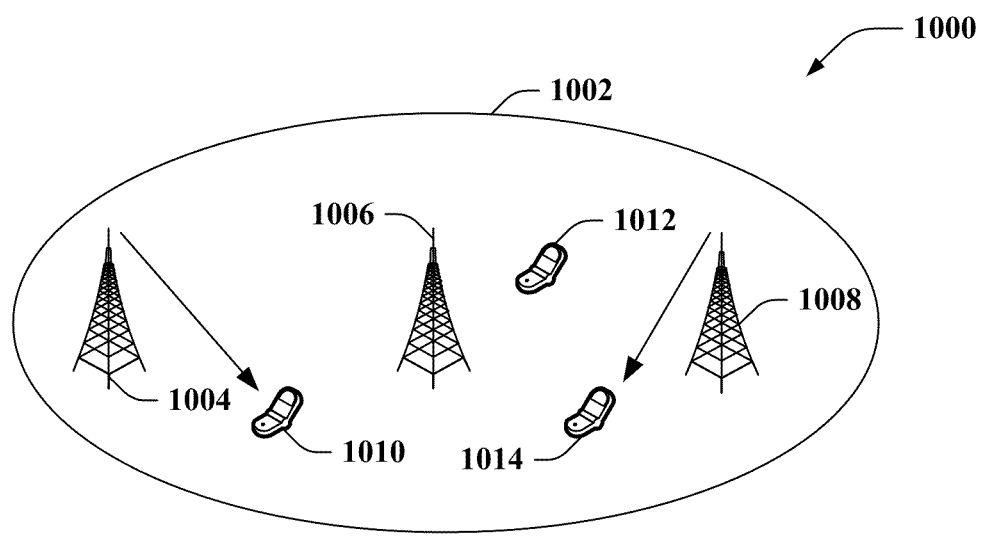
FIG. 10 is an illustration of an example system that effectuates cooperative silence (CS) within a cluster in a wireless communication environment.

With reference to FIGS. 8-10, illustrated are various example cooperation techniques that can be implemented within a cluster in a wireless communication environment. For instance, each of the example cooperation techniques can be managed, scheduled, coordinated, etc. by respective cooperation components (e.g., cooperation component 710 of FIG. 7, ... ) of base stations included in each cluster. Depicted are examples of inter-site packet sharing, cooperative beamforming, and cooperative silence; it is to be appreciated, however, that the claimed subject matter is not limited to the examples shown in FIGS. 8-10 as these techniques are shown for illustration purposes.

Turning to FIG. 8, illustrated is an example system 800 that employs inter-site packet sharing (ISPS) (e.g., coherent ISPS, ... ) within a cluster 802 in a wireless communication environment. Cluster 802 includes base stations 804 and 806 and mobile devices 808 and 810 (e.g., second order strategy, ... ). Inter-site packet sharing can also be referred to as joint processing or joint transmission. When leveraging inter-site packet sharing, each base station 804-806 within cluster 802 can be involved in data transmission to each mobile device 808-810 included in cluster 802.

Inter-site packet sharing can be most efficient with a limited number of transmit antennas per base station 804-806 (e.g., limited number of transmit antennas per node, ... ). For example, base stations 804-806 can each include one transmit antenna. Thus, the two base stations 804-806 within cluster 802 can effectively be utilized as one base station with two antennas when serving mobile devices 808-810; however, the claimed subject matter is not so limited.

Inter-site packet sharing can leverage a high bandwidth backhaul between base stations 804-806. Moreover, fast Acknowledgement and Negative Acknowledgement ((N)ACK) distribution across cooperating base stations 804-806 can be used in system 800. Further, inter-site packet sharing can be sensitive to channel state information (CSI). Inter-site packet sharing can be used by a collection of base stations 804-806 and mobile devices 808-810 that yield a substantial performance benefit.

Now referring to FIG. 9, illustrated is an example system 900 that implements cooperative beamforming within a cluster 902 in a wireless communication environment. Cluster 902 includes base stations 904 and 906 and mobile devices 908 and 910 (e.g., second order strategy, ... ). Cooperative beamforming can also be referred to as coordinated beamforming or distributed beamforming (DBF). To effectuate cooperative beamforming, base stations 904-906 can each have multiple transmit antennas; yet, the claimed subject matter is not so limited.

As depicted, base station 904 can serve mobile device 910 and base station 906 can serve mobile device 908 within cluster 902. When base station 904 sends a transmission to mobile device 910, base station 904 can yield a beam that mitigates interference to mobile device 908 (e.g., beams to mobile device 910 with transmit nulling to mobile device 908, ... ). Thus, each base station 904-906 can coordinate scheduling, control beamforming, etc. so as to lower interference to mobile device(s) within cluster 902 not being served thereby. Cooperative beamforming can leverage medium backhaul (control) requirements and can be less sensitive to channel state information (CSI) as compared to inter-site packet sharing. Hence, cooperative beamforming can be considered as an alternative to inter-site packet sharing based on a performance differential; however, the claimed subject matter is not so limited.

Turning to FIG. 10, illustrated is an example system 1000 that effectuates cooperative silence (CS) within a cluster 1002 in a wireless communication environment. Cluster 1002 includes base stations 1004, 1006, and 1008 and mobile devices 1010, 1012, and 1014 (e.g., third order strategy, ... ). As shown, base station 1004 can serve mobile device 1010, and base station 1008 can serve mobile device 1014. Further, base station 1006 can be silent for the benefit of mobile devices 1010 and 1014. Thus, cooperative silence can include a node (e.g., base station 1006, ... ) abstaining from transmission when it is beneficial for an entire neighborhood (e.g., to remove interference, ... ). Moreover, cooperative silence can leverage minimum backhaul and channel state information (CSI) requirements. It is to be appreciated, however, that the claimed subject matter is not limited to the foregoing.

Figure 11:
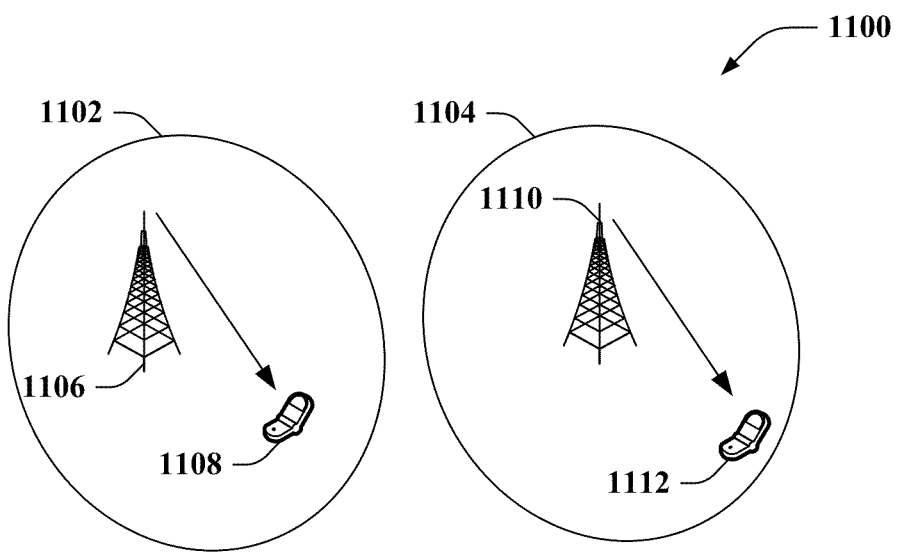
FIG. 11 is an illustration of an example system in which non-cooperative transmissions can be effectuated in a wireless communication environment.

With reference to FIG. 11, illustrated is an example system 1100 in which non-cooperative transmissions can be effectuated in a wireless communication environment. System 1100 includes two clusters 1102 and 1104. Cluster 1102 includes a base station 1106 and a mobile device 1108, and cluster 1104 includes a base station 1110 and a mobile device 1112. As shown, cluster 1102 and cluster 1104 each leverage first order strategies; however, it is to be appreciated that the claimed subject matter is not so limited. According to an illustration, when base station 1106 sends a transmission to mobile device 1108, an impact of interference associated with such transmission upon cluster 1104 need not be considered (e.g., base station 1106 need not consider interference caused to mobile device 1112, ... ). As described herein, each cluster 1102-1104 can dynamically change in time, and at any point in time, cooperation technique(s) can be leveraged within each cluster 1102-1104; yet, clusters 1102 and 1104 need not cooperate with each other, which can result in non-cooperative interference.

According to an example, non-cooperative interference between clusters 1102-1104 can be treated in a similar manner as compared to traditional base stations in conventional networks. Thus, base station 1110 can lack knowledge or control of operations effectuated within cluster 1102. Rather, base station 1110 can estimate interference caused by base stations in other clusters (e.g. base station 1106 in cluster 1102, . . . ) to mobile device 1112 without knowing beams, powers, etc. utilized by the base stations in the other clusters. For instance, base station 1110 can use long term information in order to schedule mobile device 1112, and the like.

Moreover as cluster size is increased, non-cooperative interference can decrease. For instance, when clusters are large, an amount of cooperation can increase; yet, a tradeoff associated with larger clusters is increased complexity (e.g. more scheduling decisions within the cluster, more possible local strategies to consider, . . . ). Thus, as described herein, a constraint can be placed upon a network that controls a maximum strategy order that can be employed (e.g., the maximum strategy order can be a second order, a third order, a higher order, . . . ).

While an extrinsic message passed between base stations can indicate utility and a set of constraints on a target node associated with the utility, other details on the strategy underlying a message typically can be unknown to the target node unless the target node is involved in the strategy (e.g., unless the message refers to a cooperative strategy involving the target node, . . . ). For instance, the other details can include assumed power spectral density (PSD), beams used by the target node, and so forth. Hence, the target node has to assume long term interference from the source node when evaluating its own local strategy (e.g., long term interference can be measured based on cell null pilots, . . . ). Long term interference often can be sufficient as the target node tries to avoid scheduling mobile devices when their dominant interferers are not cooperating. Yet, accounting for dominant interferers can be less important due to a limited impact on a spectral efficiency of a mobile device and/or averaging across many such interferers. Also, it can be harder to extract gains, leading to coordinating with interferers. Moreover, more accurate accounting for interference caused by non-cooperative strategies can be beneficial in some scenarios since this can allow for substantial reduction in complexity by reducing strategy order.

Thus, in addition to extrinsic utility values and a list of involved common neighbors (e.g., base station(s) and mobile device(s), . . . ), a source node can pass to a target node assumptions on strategy parameters of the target node that affect the extrinsic value. The information can be summarized, for instance, as interference level caused by the target node to the mobile device(s) involved in the strategy underlying that extrinsic message. Further, the source node can define extrinsic messages corresponding to multiple values of such parameters corresponding to the same or different underlying strategies. Different extrinsic messages can correspond to different values of the interference seen from the target node to the same or different sets of mobile devices involved in strategies underlying these extrinsic messages. The choice of multiple messages can be driven by need to serve mobile device(s) without cooperation from a target node which can be a dominant interferer (e.g., source node reports messages for different non-cooperative interference levels if mobile devices are exposed to the same set of dominant interferences and/or when the target node often denies cooperation, . . . ).

Figure 12:
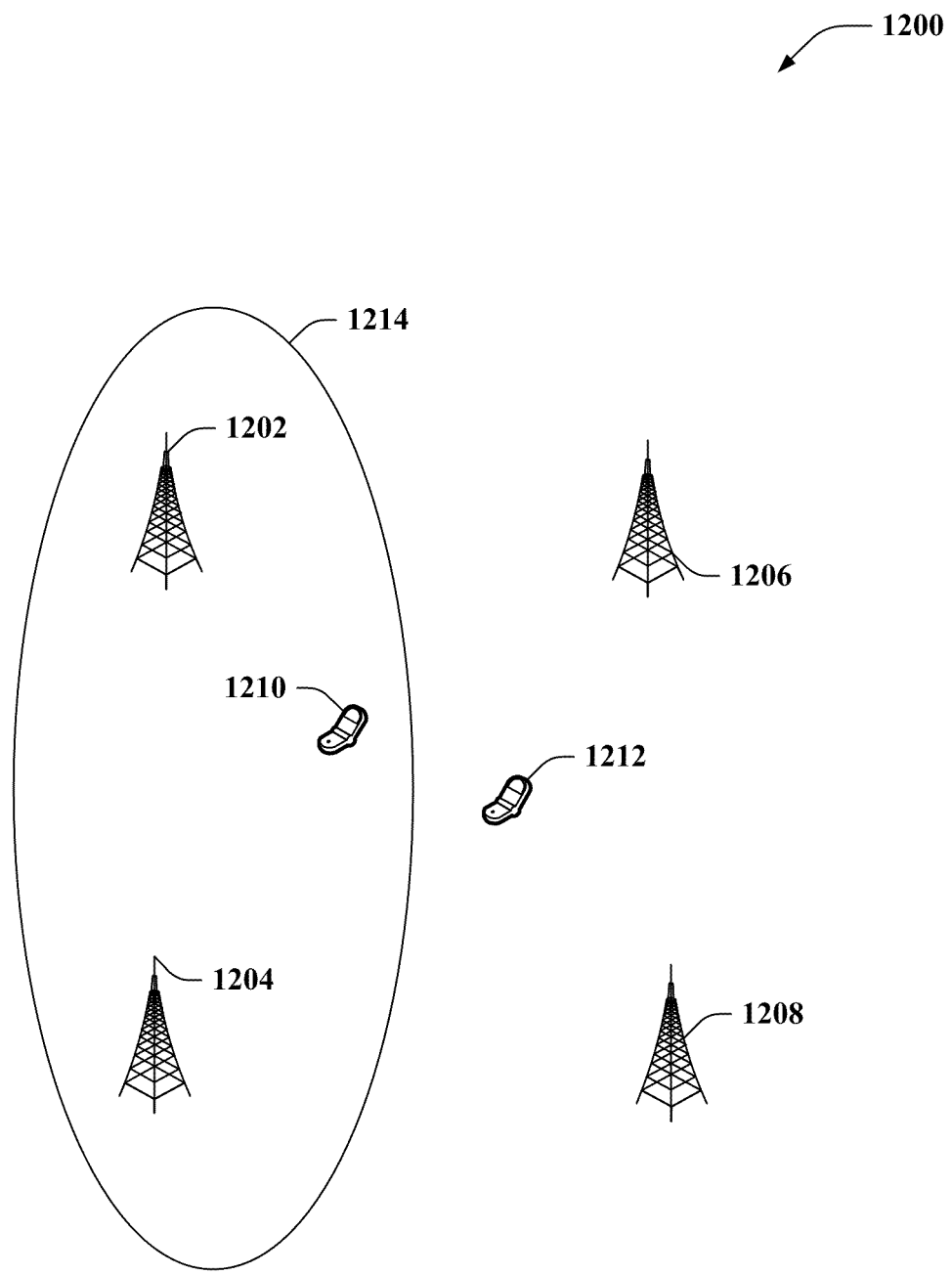
FIG. 12 is an illustration of an example system that exchanges interference information as part of a message passing strategy to manage non-cooperative interference in a wireless communication environment.

Turning to FIG. 12, illustrated is a system 1200 that exchanges interference information as part of a message passing strategy to manage non-cooperative interference in a wireless communication environment. System 1200 includes base station 1202, base station 1204, base station 1206, and base station 1208 (e.g., nodes 1202, 1204, 1206, and 1208, . . . ). Further, mobile devices 1210 and 1212 can be within a handoff region of base stations 1202-1208 in system 1200.

According to the depicted example, under a local strategy 1214, base stations 1202 and 1204 can serve mobile device 1210 (e.g., assuming a maximum strategy order is limited to 2 or 3, . . . ). Base stations 1202-1204 involved in local strategy 1214 can each compute its local utility under multiple assumptions on transmit power spectral density and/or beams of every base station not involved in local strategy 1214 (e.g., for base stations 1206 and 1208, . . . ) and formulate the corresponding multiple extrinsic messages for the base stations not involved in local strategy 1214. For instance, base station 1202 can consider local strategy 1214 that serves mobile device 1210 jointly with base station 1204. In this case, base station 1202 can evaluate local utility of local strategy 1214 under various cases of PSD settings and/or beam constraints by base station 1206 and 1208. Then, base station 1202 can formulate extrinsic messages to base station 1206 and 1208 accordingly. As a function thereof, base stations 1206 and 1208 can each compute projected utilities of various local strategies consistent with cases of the received extrinsic messages and respective constraints on beams and power spectral density. Thus, base stations 1206 and 1208 can have a more accurate estimate of utilities by having knowledge of interference caused by base stations 1202 and 1204 in a separate cluster (e.g., local strategy 1214, . . . ), which can impact clustering decisions, scheduling decisions, and so forth.

Figure 13:
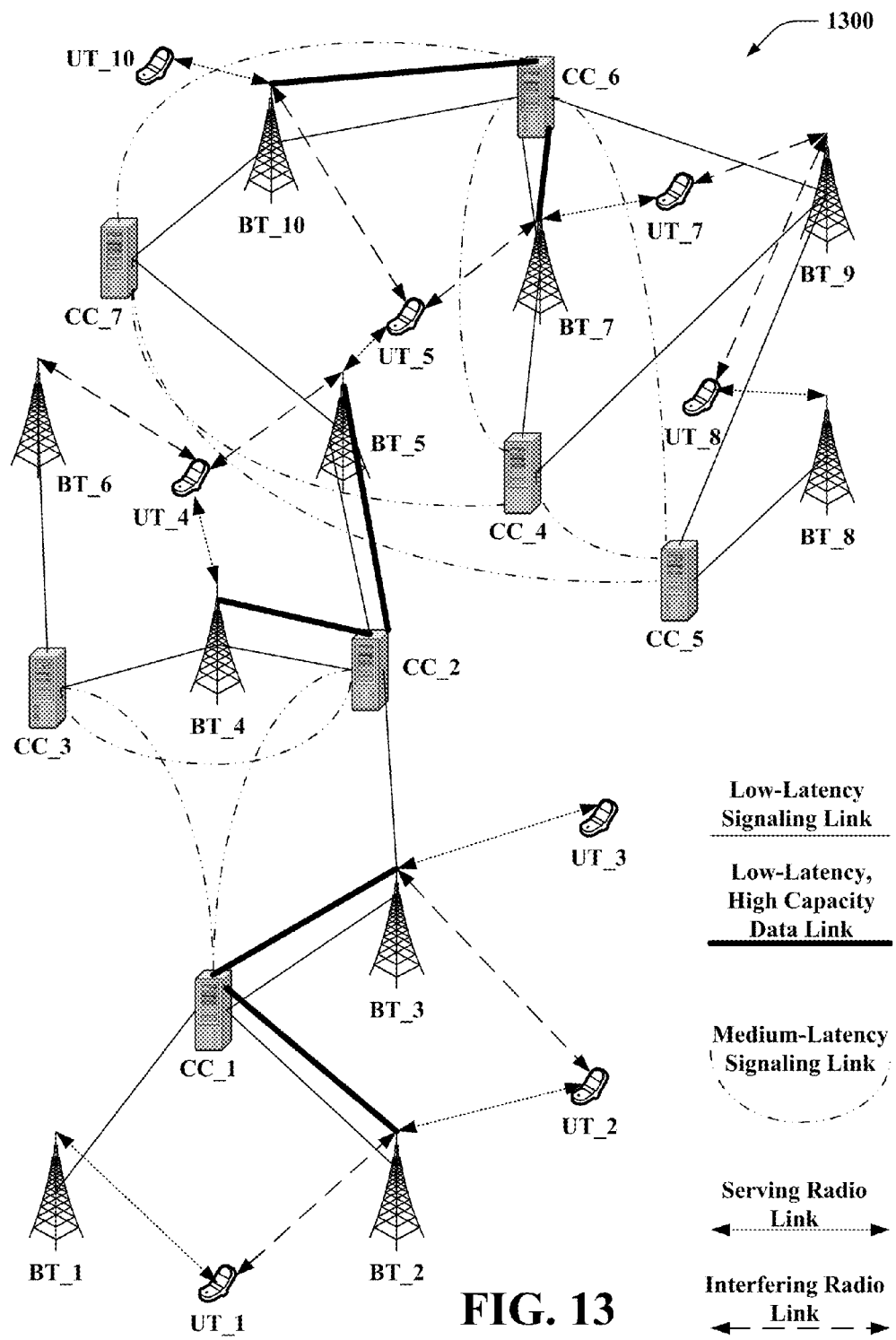
FIGS. 13-15 illustrate example graphs associated with a belief propagation framework for interference avoidance and CoMP that can be implemented in connection with the techniques described herein.
Figure 14:
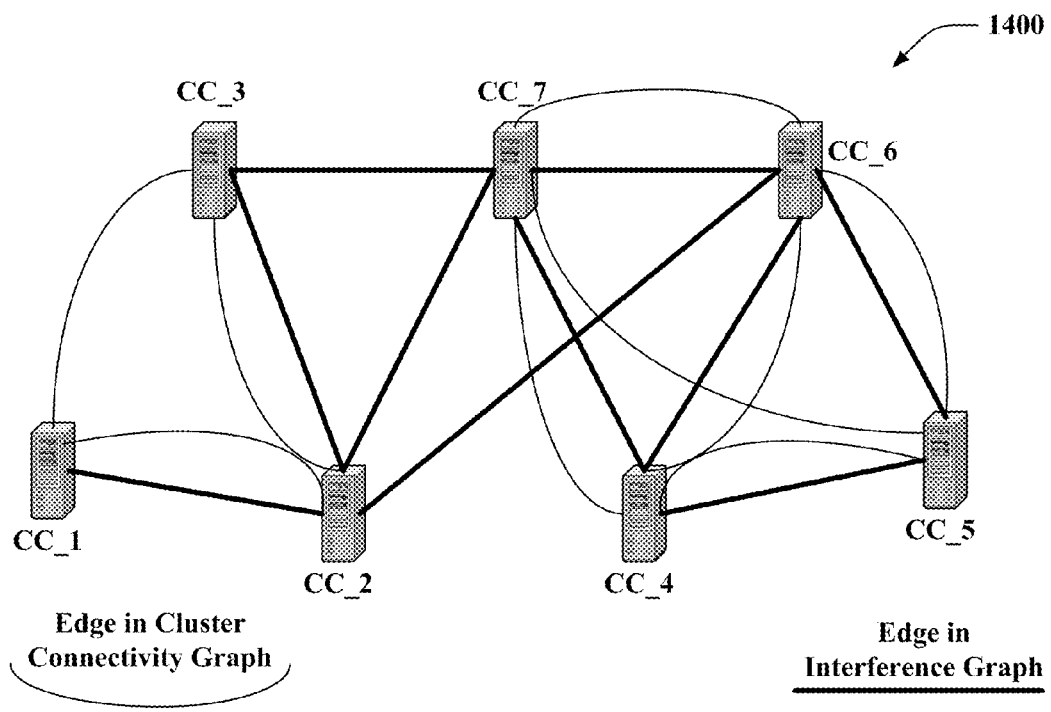
Figure 15:
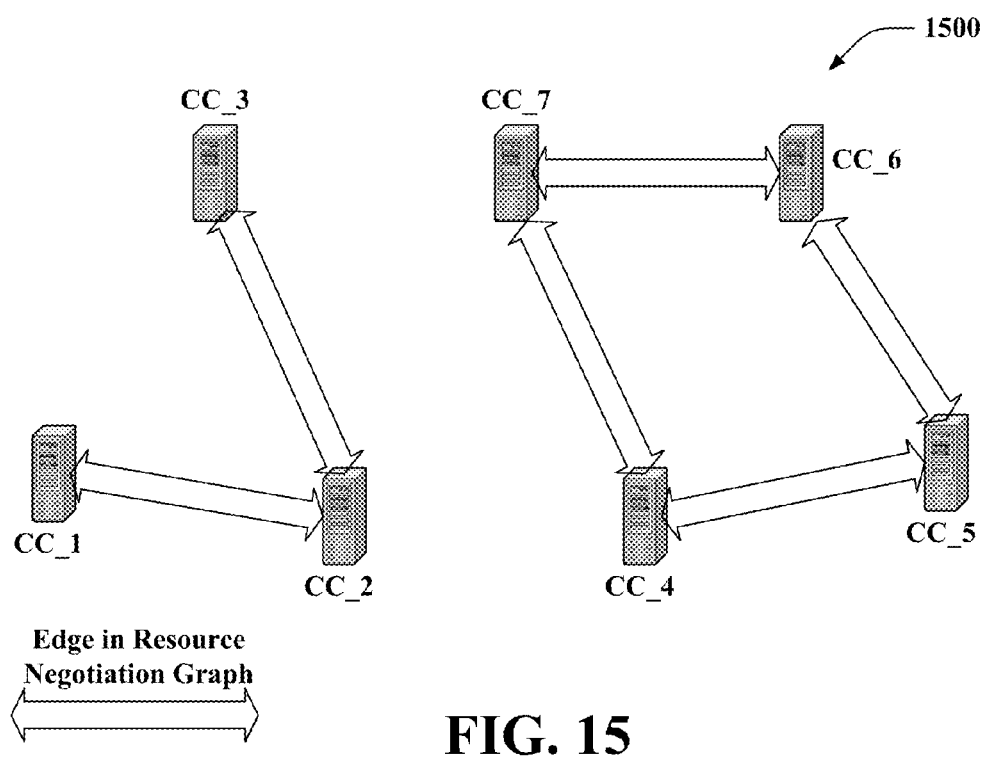

By way of further illustration, FIGS. 13-15 illustrate example graphs associated with a belief propagation framework for interference avoidance and CoMP that can be implemented in connection with the techniques described herein. While FIGS. 13-15 and the accompanying discussion below depict various examples in the context of static clusters (e.g., each with a cluster controller, . . . ), it is contemplated that these approaches can be extended to clusters that are dynamically formed over time. Hence, the below techniques can be leveraged upon dynamically selecting an optimal set of local strategies across a network at a given time in a distributed manner. Moreover, it is contemplated that the distributed clustering concept noted herein can accommodate static clusters. It is contemplated, however, that the claimed subject matter is not limited by the below discussion.

For instance, the static clustering concept can be based on a notion of static master clusters based on deployment and backhaul topology. Cooperation can be possible within a master cluster and interference management can handle boundaries. Static clustering can be based on the Remote Radio Head (RRH) concept that can include light remote nodes connected to a macro node via dedicated lines (e.g. cable, fiber, . . . ), possibly with a centralized processing architecture. Further, the remote nodes can be independent base stations. Distributed clustering can support using utility weights to define master clusters. For example, strategies that stretch across RRH boundaries can be assigned zero utility weight to prevent cooperation across such boundaries. By way of another example, different utility weights can be used for different strategies that stretch across RRH consistent with inter-RRH backhaul quality (e.g., inter-site packet sharing may be unable to be used while distributed beamforming can be used, . . . ). Pursuant to a further example, clustering across RRH boundaries can be explicitly disabled. Static clustering can be beneficial if RRH is a target scenario. It is to be appreciated, however, that the claimed subject matter is not limited to the foregoing.

Consider a Radio Access Network (RAN) in a wireless cellular system, defined by a set of base station transceivers (BTs), denoted $B=\{BT_1, BT_2, \ldots\}$. A base station transceiver (BT) can refer to an omni-directional cell/base station (e.g., node, . . . ), or a single sector of a sectorized base station. Each base station transceiver (BT) can have one or more transmit antennas and one or more receive antennas, used to communicate with user terminals (UT) (e.g., mobile devices, . . . ) over a wireless channel.

Each user terminal (UT) in the wireless cellular system can select a serving base station transceiver based on various criteria. The Interference Management Set (IMset) of a user terminal can include a serving BT, along with other BTs whose long-term forward link (FL) (reverse link (RL)) signal strength exceeds (Q-X) dB. In this expression, the term Q can denote the long-term FL (RL) received signal strength between the serving BT and the user terminal (e.g., expressed in dB, . . . ), and the term $X \geq 0$ is an appropriately chosen parameter (e.g., 10, value greater than 10, value less than 10, . . . ). Note that the serving BT of a user terminal can also be part of the IMset of the user terminal. The IMset of the user terminal extends the notion of active set in CDMA systems, and can include potentially dominant interferers (interferees) of the user terminal. $IM_u \subseteq B$ can denote the IMset of the user terminal u.

A cluster can be a predefined (static) subset of BTs in the RAN. According to another example, a cluster can be dynamically formed as described herein. Let $C=\{C_1, C_2, \ldots, C_L\}$ denote a set of all clusters defined in the RAN (e.g., at a given time, . . . ), wherein $C_j \subseteq B$ for each $j=1, 2, \ldots, L$. Pursuant to an example, different clusters can overlap with each other (e.g., have a non-empty intersection, . . . ). By way of further example, different clusters can be non-overlapping (e.g., the intersection can be an empty set, . . . ). Moreover, the clusters can be equipped with a logical entity called a cluster controlled, which can be physically embedded in one of the BTs in the cluster. Additionally or alternatively, functions described below as being carried out by the cluster controlled can be effectuated by one or more BTs in the cluster.

BTs in a cluster can be connected to the cluster controller through low-latency (e.g., <1 msec, . . . ) signaling links. In addition, certain BTs in a cluster can also be connected to their cluster controller with low-latency (e.g., <1 msec, . . . ), high-capacity (e.g., >100 MBps, . . . ) data links. Further, certain pairs of cluster controllers can be connected to each other through medium-latency (e.g. 10-20 msec, . . . ) signaling links.

The cluster controller can instruct each BT in its cluster to radiate a certain signal on the wireless channel. The signal radiated by a BT can be a superposition (sum) of signals induced by the controllers of clusters that include the BT. The signal induced by a cluster at a BT can also be referred to as the signal transmitted by the cluster from the given BT. The overall transmitted signal of a cluster can refer to a combination (e.g., direct-product, . . . ) of signals induced by the cluster at BTs belonging to that cluster.

A cluster that includes the serving BT of a user terminal can be referred to as a serving cluster of the user terminal. Note that although a user terminal can have a single serving BT, it can have several serving clusters. Moreover, each serving cluster of a user terminal can have access to a channel state and a state of data queues/flows of the user terminal. $S_j$ can denote the set of user terminals served by the cluster $C_j$.

The cluster controller can decide the signal to be transmitted by each BT in the cluster, and can also decide the data carried by those signal resources to different user terminals served by that cluster. The resource management (or scheduling) decisions can be conveyed from the cluster controller to the BTs in the cluster using the low-latency signaling links. In the case of distributed beamforming, the cluster controller can assign certain beam directions on certain subcarriers to different BTs, so as to steer spatial null(s) towards user terminals that are being served by neighboring BTs on the same set of subcarriers at the same time. In the case of inter-site packet sharing, data associated with a given user terminal can be transmitted/received from/at multiple BTs in the cluster, provided high-speed data connectivity is supported among the BTs of interest.

In a system without joint base station processing, each cluster can coincide with a base station transceiver (BT). In a system with intra-NodeB joint processing, each cluster can coincide with a (e)NodeB, which can be a set of base station transceivers (BTs) supported by a system of collocated bas band processors. Note that the radio frequency (RF) modules/antennas of different BTs in a (e)NodeB need not be collocated (e.g., as in the case of a Remote Radio Head (RRH) architecture, . . . ).

If low-latency signaling links can be established between any cluster controller and any BT, then the set of clusters C can be defined such that the IMset of any user terminal is included in some cluster in the RAN. In other words, for a user terminal u with an IMset $IM_u$, then $IM_u \subseteq C_j$ for some cluster index j. Yet, to limit complexity of cluster controllers, the clusters can be configured to be smaller, subject to the above IMset criterion.

FIGS. 13-15 illustrate several graphs based on topography of UTs, BTs and clusters (e.g. cluster controllers (CCs), . . . ) characterizing a Radio Access Network (RAN).

Given a (undirected) graph G, two vertices p and q can be said to be neighbors of each other if the graph G has an edge between the two vertices. The two vertices p and q can be said to be connected to each other if there is a path between them in the graph G. The diameter of a graph can denote a maximum distance between two vertices in the graph. The girth of a graph can denote a length of a shortest cycle in the graph.

An interference graph of the Radio Access Network (RAN) can be a graph $G_I$ (e.g, shown in FIG. 14, . . . ), each of whose vertices represents a cluster. The graph $G_I$ can have an edge between the vertex (cluster) $C_i$ and another vertex $C_j$, where $j \neq i$, if a UT served by cluster $C_i$ has a BT belonging to cluster $C_j$ in its IMset (or vice versa). The interference neighborhood of a cluster $C_j$ can refer to a set of clusters $C_i$ such that $G_I$ has an edge between $C_i$ and $C_j$. The set of indices of clusters in the interference neighborhood of $C_j$ can be denoted as N(j).

A cluster connectivity graph of the RAN can be a graph $G_C$ (e.g., shown in FIG. 14, . . . ), each of whose vertices represents a cluster. The graph $G_C$ can have an edge between vertices (clusters) $C_i$ and $C_j$ if there exists (at least) a medium latency signaling link between the clusters $C_i$ and $C_j$.

A resource negotiation graph $G_R$ (e.g., shown in FIG. 15, . . . ) can be a subgraph of the interference graph $G_I$, and the cluster connectivity graph $G_C$. In other words, the graph $G_R$ can have an edge between clusters $C_i$ and $C_j$ only if the cluster $C_i$ is in the interference neighborhood of cluster $C_j$, and there is (at least) a medium latency signaling link between the clusters $C_i$ and $C_j$. Further, the resource negotiation graph $G_R$ can be constructed so as to minimize its diameter (e.g., mitigate long chains, . . . ) and maximize its girth (e.g., mitigate short chains, . . . ). The set of indices of clusters that are neighbors of $C_j$ in the interference negotiation graph $G_R$ can be denoted by $N_+(j)$. Hence, the set $N_+(j)$ can be a subset of the interference neighborhood $N(j)$. A complementary set can be denoted as $$N_-(j) \triangleq N(j) \backslash N_+(j),$$

which can represent the set of cluster indices of interference neighbors of the cluster $C_j$, that do not have an edge to the cluster $C_j$ in the resource negotiation graph.

Moreover, extended neighborhoods can be defined as follows:

$$N^e(j) \triangleq N(j) \cup \{j\}, N_+^e(j) \triangleq N_+(j) \cup \{j\}$$

Further, it can follow that $N_-(j)=N^e(j) \backslash N_-^e(j)$. The set of clusters identified by the indices $N^e(j)$ can be referred to as the extended interference neighborhood of the cluster $C_j$. Note if the resource negotiation graph has no cycles of length 3, then for two neighboring clusters $C_i$ and $C_j$, it can follow that $N_-^e(i) \cap N_-^e(j)=\{i,j\}$.

Referring to FIG. 13, illustrated is an example system 1300 with multiple user terminals (UTs), base station transceivers (BTs), and cluster processors (e.g., cluster controllers (CCs), . . . ). System 1300 shows example signaling/data links between cluster controllers and base station transceivers.

The set of user terminals served by different clusters can be given by: $S_1=\{UT_1, UT_2, UT_3\}$, $S_2=\{UT_3, UT_4, UT_5\}$, $S_3=\{UT_4\}$, $S_4=\{UT_7\}$, $S_5=\{UT_8\}$, $S_6=\{UT_7, UT_{10}\}$, $S_7=\{UT_5, UT_{10}\}$.

Turning to FIG. 14, illustrated is an example depiction 1400 of an interference graph $G_I$ and a cluster connectivity graph $G_C$ corresponding to system 1300 of FIG. 13. Moreover, FIG. 15 illustrates a resource negotiation graph $G_R$ corresponding to system 1300 of FIG. 13.

In the depicted example, the cluster connectivity graph as well as the resource negotiation graph can have two connected components, with vertex sets $\{C_1, C_2, C_3\}$ and $\{C_4, C_5, C_6, C_7\}$. It can also be seen that $N_+(2)=\{3\}$, $N_-(2)=\{6,7\}$, and $N_{G_I}(2)=\{3,6,7\}$.

The resource negotiation graph need not have edges between pairs of interference neighbors $(C_2, C_6)$, $(C_2, C_7)$ and $(C_3, C_7)$ because there is no signaling connectivity between these pairs of clusters. On the other hand, there is no edge between interference neighbors $(C_4, C_7)$ even though they lack a signaling link there between; this can be done so as to eliminate 3-cycles in the resource negotiation graph $G_R$.

A signal resource element can refer to a combination of one (OFDM) subcarrier, one (OFDM) symbol and one spatial beam. A spatial beam is a complex linear combination of transmit antenna weights, or precisely, a complex-valued beamforming vector of unit norm, each of whose components refers to a transmit antenna of a BT in the network. A beam is said to be localized to a BT if all non-zero components of the beamforming vector correspond to transmit antennas of the given BT. A beam is said to be localized to a cluster if all non-zero components of the beamforming vector correspond to transmit antennas of some BT in the given cluster. A signal resource block is a set of signal resource elements, all of whose beams are localized to (at least) one cluster. Typically, a signal resource block can be defined by a Cartesian product of a set of (OFDM) subcarriers, a set of (OFDM) symbols/time-slots, and a set of (spatial) beams localized to a cluster.

Recall that a cluster (controller) induces each BT in the cluster to transmit a certain signal, and that transmit signal of a cluster can refer to the collection (direct sum) of the signals the cluster induces at each of its BTs. The transmit power $p(c,r) \geq 0$ of a cluster c on a resource block r can refer to a power of the signal obtained by (orthogonally) projecting the transmit signal of the cluster on to the signal subspace spanned by the resource elements in the resource block r. For instance, if the resource block r includes a certain set of subcarriers over all symbols, coupled with all possible beams that can be formed by a particular BT, then the transmit power $p(c,r) \geq 0$ of the cluster c on the resource block r refers to the total power of the signal transmitted by the cluster from the given BT on all subcarriers included in the resource block. In another example, if the resource block r refers to a certain beam direction at each BT belonging to the cluster c, then $p(c,r) \geq 0$ can refer to the sum of the power of signals transmitted by the cluster along the given beam direction from each BT belonging to that cluster.

Suppose the RAN defines a set of signal resource blocks $R=\{R_1, R_2, R_3, \ldots, R_N\}$ A transmit power profile of a cluster $C_j$ is a non-negative real-valued vector $$\underline{P}_j \triangleq (P_{j,1}, P_{j,2}, P_{j,3}, \ldots, P_{j,N}),$$

which satisfies $P_{j,k}=0$ unless the resource block $R_k$ is localized to the cluster $C_j$. This condition can capture the fact that a cluster controller typically cannot induce any signal at a BT not belonging to the cluster. If a cluster $C_j$ is allocated a transmit power profile $\underline{P}_j$, then the signal transmitted by the cluster $C_j$ satisfies the inequalities $p(C_j, R_k) \leq P_{j,k}$ for each $1 \leq k \leq N$. In other words, the cluster typically does not transmit a signal whose power exceeds the allocated profile on a resource block $R_k$. Two transmit power profiles $\underline{P}_i$ and $\underline{P}_j$ allocated to clusters $C_i$ and $C_j$ respectively are said to be non-overlapping if there is no component k such that both $P_{i,k}$ and $P_{j,k}$ are positive. Note that (valid) power profiles $\underline{P}_i$ and $\underline{P}_j$ of two clusters $C_i$ and $C_j$ are non-overlapping if none of the resource blocks $\{,R_k\}$ are localized to both clusters, or if the clusters $C_i$ and $C_j$ do not share any BTs.

The transmit power profile allocated to each cluster determines the degrees of freedom with which the cluster can serve its user terminals. Over a given duration of time (scheduling epoch), each cluster can be allocated a transmit power profile based on an inter-cluster negotiation process. Once the transmit power profile is allocated to each cluster, the cluster can manage its resources and data transmissions so as to optimize a certain utility function. These concepts and mechanisms are described in more detail below.

The following relates to utility metrics that can be employed. Suppose that each cluster $C_j$ can have a transmit power profile $\underline{P}_j(t)$ at time t. A (maximum) strength of the signal received by a user terminal from its serving cluster $C_j$ on each of the signal resource blocks can be determined by the transmit power profile $\underline{P}_j$ of the serving cluster $C_j$. On the other hand, a (maximum) interference power received by the same user terminal on each of the signal resource blocks can be determined by the transmit power profile $\underline{P}_l$ of the clusters $C_l$ that include a BT in the IMset of the user terminal. It follows that the signal to interference plus noise ratio (SINR) on a resource block that the cluster $C_j$ can achieve at each of the user terminals can be determined by the combination of transmit power profiles $\{\underline{P}_l \mid l \in N^e(j)\}$. At each scheduling opportunity, the cluster controller at $C_j$ can allocate signal resources and packet formats to each of its users, which can result in certain data rates (e.g. consistent with the SINR, ...) achieved by the users served by the cluster, at each time instant t. Let $r_{u,j}$ denote the data rate provided to the user terminal $U \in S_j$ by the cluster $C_j$ at any given time.

It can be evident that the set of combinations of data rates $$\left\{ \underset{u \in S_j}{\mathrm{O}} r_{u,j} \right\}$$

that can be provided by the cluster $C_j$ to user terminals served by that cluster is determined by the transmit power profiles $\{\underline{P}_l \mid l \in N^e(j)\}$. This set of achievable data rate combinations can be denoted by $$\Gamma_j \left( l \in \overset{\mathrm{O}}{N^e_+}(j) \underline{P}_l \right).$$

Let $$U_{j,l} \left( \underset{u \in S_j}{\overset{\theta}{}} r_{u,j}(t) \right)$$

denote the local marginal utility metric (e.g., marginal with respect to time, ...) achieved by the cluster $C_j$ at time l, if it allocates the data rate combination $$\underset{u \in S_j}{\overset{\mathrm{O}}{}} r_{u,j}$$

to its users at time l. For instance, under the proportional fair scheduling of best-effort traffic, the local marginal utility function can have the form $$U_{j,l} \left( \underset{u \in S_j}{\overset{\theta}{}} r_{u,j} \right) = \sum_{u \in S_j} \frac{r_{u,j}}{T_u(t)},$$

where $T_u(t)$ is the average (filtered) throughput of the user u at time l. More generally, the local, marginal utility function can have the form $$U_{j,l} \left( \underset{u \in S_j}{\overset{\theta}{}} r_{u,j} \right) = \sum_{u \in S_j} \pi_u(l) r_{u,j},$$

where $\pi_u(l)$ represents the scheduling priority of the user u at time l. The scheduling priority $\tau_{u,l}$ can depend upon the transmission deadline of packets in the data queues of the user, as well as historical throughput provided to various data streams associated with the user terminal.

Given the transmit power profiles $$\underset{1 \leq l \leq L}{\overset{\mathrm{O}}{}} \underline{P}_l$$

of different clusters, the optimal scheduler for the cluster $C_j$ at time l can allocate the data rate combination from the set $$\Gamma_j \left( l \in \overset{\mathrm{O}}{N^e_+}(j) \underline{P}_l \right)$$

that maximizes the local marginal utility function $U_{j,l}(\ldots)$. In other words, the optimal scheduling policy at the cluster $C_j$ results in the following local marginal utility metric:

$$U^*_{j,l} \left( \underset{l \in N^e_-(j)}{\overset{\theta}{}} \underline{P}_l \right) \triangleq \underset{\underset{u \in S_j}{\overset{\mathrm{O}}{r_{u,j} \in \Gamma_j}}\left( \underset{l \in N^e_+(j)}{\overset{\mathrm{O}}{}} \underline{P}_l \right)}{sup} U_{j,l} \left( \underset{u \in S_j}{\overset{\theta}{}} r_{u,j} \right).$$

The transmit power profiles $\{\underline{P}_j\}$ can be chosen to maximize the global marginal utility function as follows:

$$U^*_l \left( \underset{1 \leq l \leq L}{\overset{\theta}{}} \underline{P}_l \right) \triangleq \sum_{l=1}^{L} U^*_{j,l} \left( \underset{l \in N^e_+(j)}{\overset{\oplus}{}} \underline{P}_l \right).$$

However, resource negotiation can be restricted to message exchanges between neighboring clusters in the resource negotiation graph $G_R$, which is a subgraph of the interference graph $G_I$. To this end, the projected marginal utility functions can be defined as set forth below.

For this purpose, each cluster $C_j$ can use a nominal transmit power profile $\underline{P}_{j,m}^{nom}(l)$ for each cluster $C_m \in N_-(j)$. The projected, local marginal utility function of a cluster $C_j$ can thus be given by:

$$\tilde{U}_{j,l} \left( \underset{l \in N^e_+(j)}{\overset{\theta}{}} \underline{P}_l(l) \right) \triangleq U^*_{j,l} \left( \underset{l \in N^e_+(j)}{\overset{\theta}{}} \underline{P}_l(l) \underset{m \in N_-(j)}{\overset{\theta}{}} \underline{P}_{j,m}^{nom} \right)$$

$$= \underset{\underset{u \in S_j}{\overset{\mathrm{O}}{r_{u,j}}}}{sup} U_{j,l} \left( \underset{u \in S_j}{\overset{\oplus}{}} r_{u,j} \right)$$

The supremum with respect to the argument $$\underset{u \in S_j}{\overset{\mathrm{O}}{}} r_{u,j}$$

can be taken over the set $$\Gamma_j \left( \left\{ \underset{l \in N^e_+(j)}{\overset{\theta}{}} \underline{P}_l(t) \right\} \left\{ \underset{m \in N_-(j)}{\overset{\theta}{}} \underline{P}_{j,m}^{nom} \right\} \right)$$

of all achievable data rate combinations subject to the given transmit profiles.

It can be desired to maximize the projected, global marginal utility function $$\tilde{U}_t\left(\underset{1 \le l \le L}{\theta} P_l(t)\right) \triangleq \sum_{j=1}^{L} \tilde{U}_{j,l}\left(\underset{l \in N_-^e(j)}{\theta} P_l(t)\right)$$

by choosing the optimal transmit power profiles $\underline{P}_j(t)$ for each cluster $C_j$. This can be accomplished through a message passing algorithm described below.

Further, a resource negotiation algorithm can be supported. Suppose clusters $C_p$ and $C_q$ have an edge between them in the resource negotiation graph $G_R$. The message from cluster $C_p$ to cluster $C_q$ can include the function:

$$M_{i \to j}\left(\underset{l \in N_+^e(i) \cap N_-^e(j)}{\bigoplus} P_l(t)\right) =$$

$$\underset{\{P_l | l \notin N_-^e(j)\}}{\sup} \left[\tilde{U}_{i,l}\left(\underset{l \in N_-^e(j)}{\theta} P_l\right) + \sum_{m \in N_+(i) \setminus \{j\}} M_{m \to i}\left(\underset{l \in N_+^e(m) \cap N_+^e(i)}{\theta} P_l\right)\right]$$

After the above message passing algorithm converges, each cluster $C_i$ can find the transmit power profile $$\underset{l \in N_+^e(i)}{\theta} P_l = \underset{l \in N_+^e(i)}{\theta} \hat{P}_l$$

that maximizes the below expression:

$$\tilde{U}_{i,l}\left(\underset{l \in N_+^e(i)}{\theta} P_l\right) + \sum_{m \in N_+(i)} M_{m \to i}\left(\underset{l \in N_+^e(m) \cap N_-^e(i)}{\theta} P_l\right) =$$

$$M_{i \to j}\left(\underset{l \in N_-^e(i) \cap N_-^e(j)}{\theta} P_l(l)\right) + M_{j \to i}\left(\underset{l \in N_-^e(i) \cap N_-^e(j)}{\theta} P_l(l)\right)$$

for any neighbor $C_j$ of the cluster $C_i$ in the graph $G_R$. Further, the cluster $C_i$ can select the power profile $\hat{P}_i$ for its own signal transmissions (e.g, through the associated BTs, . . . ).

Moreover, if the graph $G_R$ lacks 3-cycles, then $N_+^e(i) \cap N_-^e(j) = \{i,j\}$.

Note that in the above message passing algorithm, a cluster $C_i$ can send a message to its neighboring clusters $C_j$ for each value of the transmit power profile vector $$\underset{l \in N_+^e(i) \cap N_+^e(j)}{\theta} P_l(l).$$

In order to minimize the number of messages to be exchanged, the set of valid profiles $\underline{P}_j$ of a cluster $C_j$ can be partitioned into a small number of subsets, $$\{Q_{j,1}, Q_{j,2}, \ldots, Q_{j,n_j}\} \triangleq \Pi_j.$$

In other words, $Q \cap Q' = \phi$ whenever $Q \ne Q' \in \Pi_j$, and the union of all sets $Q \in \Pi_j$ is the set of all power profiles $\underline{P}_j = \theta_i P_{j,i}$ such that $P_{j,i} = 0$ unless the resource block $R_i$ is localized to the cluster $C_j$. In what follows, $Q_j$ can be used to denote a generic element of the partition $\Pi_j$ (e.g., $Q_j \in \Pi_j, \ldots$). Note that $Q_j$ can represent a subset of transmit power profiles that are localized to the cluster $C_j$.

Further, the quantized, projected marginal utility functions can be defined for all $Q_l \in \Pi_l$ as follows:

$$\tilde{U}_{j,l}^q\left(\underset{l \in N_+^e(j)}{\theta} Q_l\right) = \underset{P_l \in Q_l}{\sup} \tilde{U}_{j,l}\left(\underset{l \in N_+^e(j)}{\theta} P_l\right).$$

The message passing equations, thus, can take the form:

$$M_{i \to j}^q\left(\underset{l \in N_+^e(i) \cap N_-^e(j)}{\bigoplus} Q_l\right) =$$

$$\underset{Q_l \in \Pi_l : l \notin N_+^e(j)}{\sup} \left[\tilde{U}_{i,l}\left(\underset{l \in N_-^e(i)}{\theta} Q_l\right) + \sum_{m \in N_+(i) \setminus \{j\}} M_{m \to i}^q\left(\underset{l \in N_+^e(m) \cap N_+^e(i)}{\theta} Q_l\right)\right]$$

After the above message passing algorithm converges, each cluster $C_i$ can determine the transmit power profile subset $$\underset{l \in N_+^e(i)}{\theta} Q_l = \underset{l \in N_+^e(i)}{\theta} \hat{Q}_l$$

that maximizes the expression $$\tilde{U}_{i,l}^q\left(\underset{l \in N_-^e(i)}{\theta} Q_l\right) + \sum_{m \in N_+(i)} M_{m \to i}\left(\underset{l \in N_+^e(m) \cap N_+^e(i)}{\theta} Q_l\right) =$$

$$M_{j \to i}^q\left(\underset{l \in N_+^e(j) \cap N_+^e(i)}{\theta} Q_l\right) + M_{i \to j}^q\left(\underset{l \in N_+^e(i) \cap N_-^e(j)}{\theta} Q_l\right)$$

for any $j \in N_-(i)$. The foregoing can be maximized among all subsets $Q_l$ included in the partition $\Pi_l$, for $l \in N_-^e(i)$.

Once the algorithm converges on the preferred power profile subsets $\{\hat{Q}_l\}$, these sets can be further partitioned, and the message passing algorithm can be repeated on the elements of the new partition. This process of successive refinement can be continued until the optimal power profiles $\{\hat{P}_l\}$ are represented with sufficient precision by the partitioned power profile subsets $\{\hat{Q}_l\}$.

Figure 16:
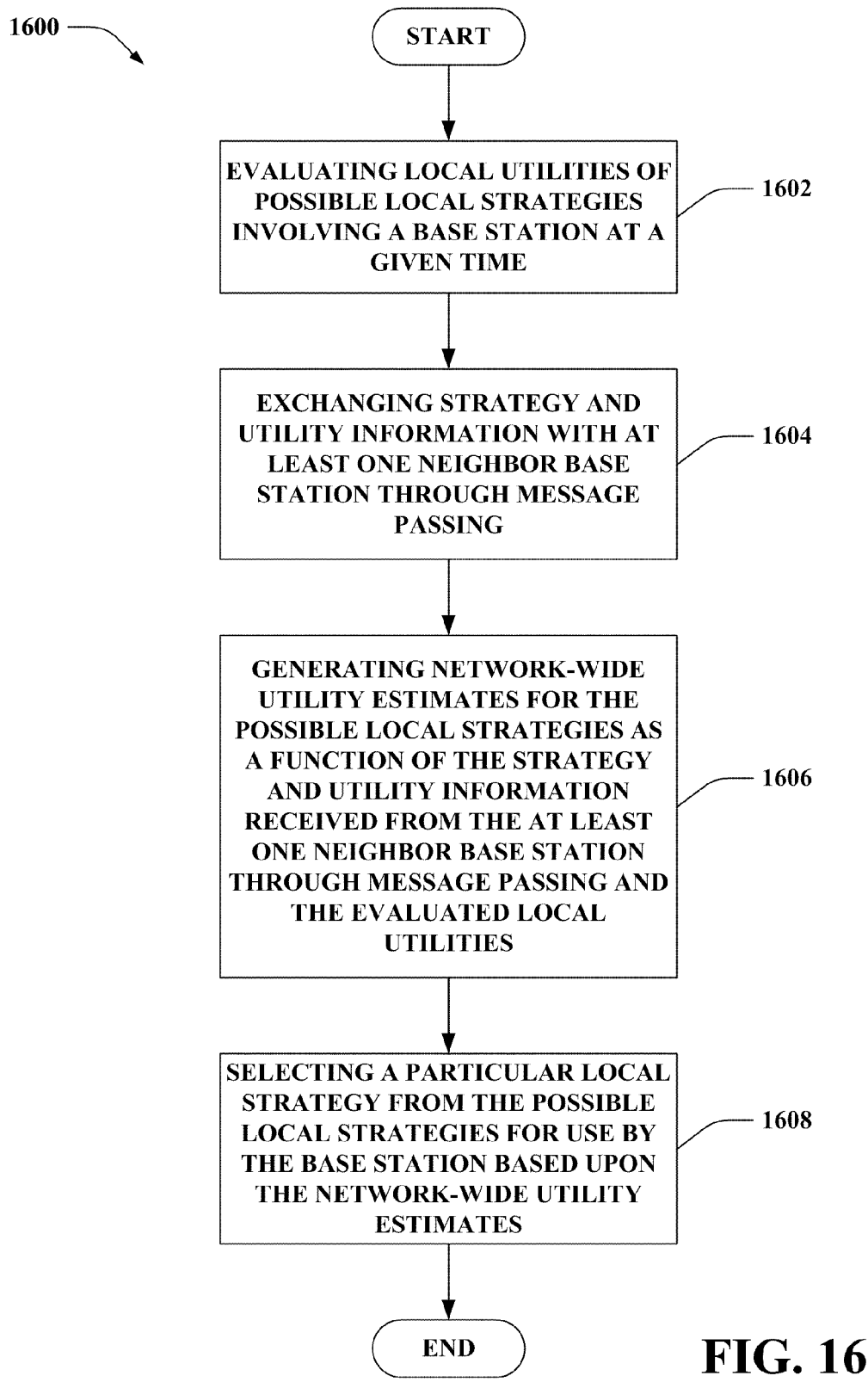
FIG. 16 is an illustration of an example methodology that facilitates dynamically forming clusters in a wireless communication environment.
Figure 17:
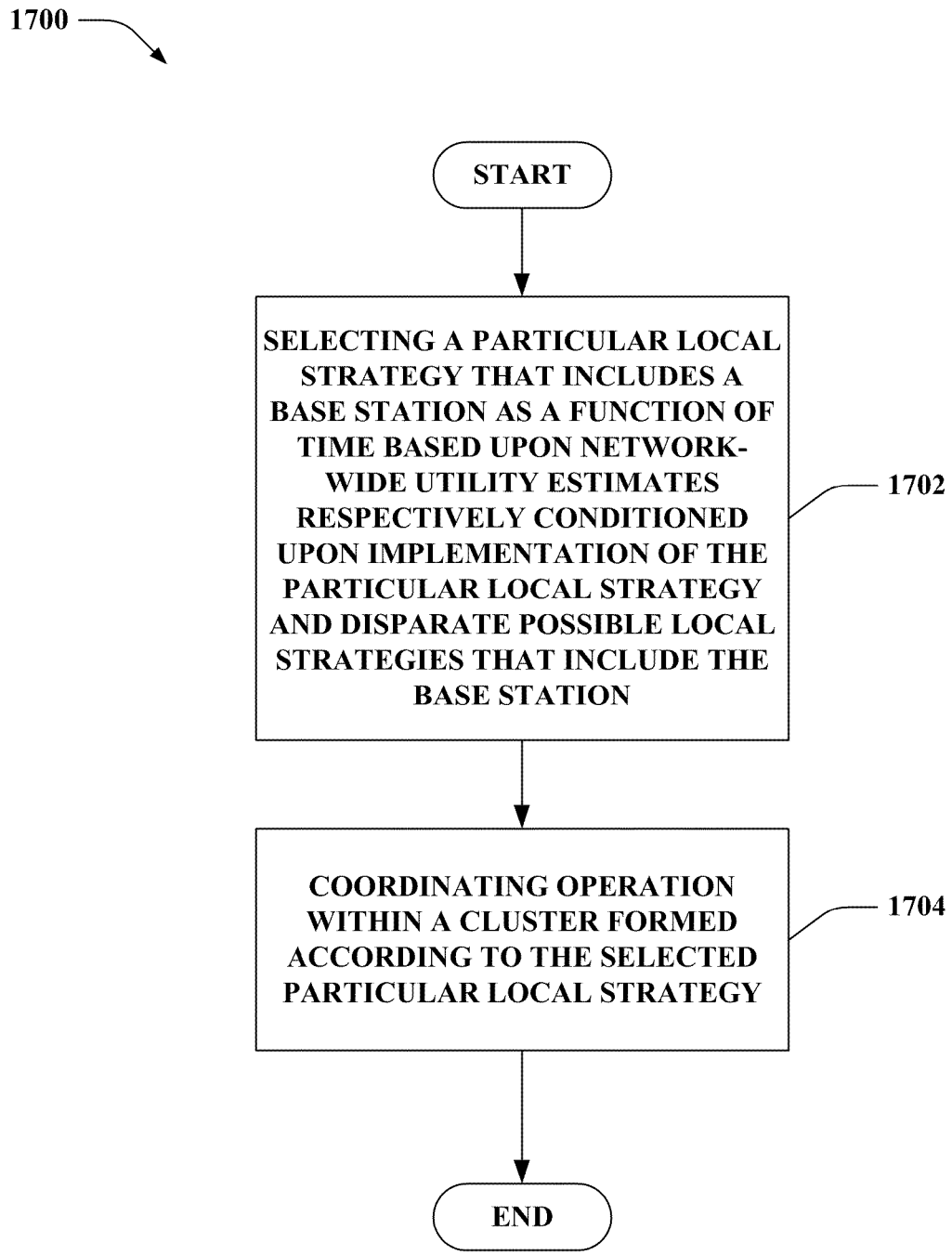
FIG. 17 is an illustration of an example methodology that facilitates leveraging cooperation between base stations in a wireless communication environment.

Referring to FIGS. 16-17, methodologies relating to dynamically selecting clustering strategies in a distributed manner in a wireless communication environment are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 16, illustrated is a methodology 1600 that facilitates dynamically forming clusters in a wireless communication environment. At 1602, local utilities of possible local strategies involving a base station at a given time can be evaluated. Each of the possible local strategies can include a set of base stations (e.g., including the base station evaluating the local utilities and possibly one or more neighboring base stations, . . . ), a set of mobile devices (e.g., one or more mobile devices, . . . ) served by the set of base stations, and underlying antenna weights and power spectral densities for the base station(s) in the set of base stations to serve the set of mobile devices. Moreover, the possible local strategies can be subject to a limited maximum order constraint (e.g., a maximum strategy order can be two, three, an integer greater than three, . . . ). The local utilities, for instance, can be summations of weighted rates that can be achieved by at least one mobile device respectively served under each of the possible local strategies.

At 1604, strategy and utility information can be exchanged with at least one neighbor base station through message passing. According to an example, message passing can be iterative; however, the claimed subject matter is not so limited. Further, the base station can send the strategy and utility information yielded by the base station to the at least one neighbor base station and receive the strategy and utility information respectively yielded by each of the at least one neighbor base station from the at least one neighbor base station.

By way of example, the strategy and utility information can include a cooperative utility value and a non-cooperative utility value. The cooperative utility value can reflect an estimate of total utility assuming cooperation between a source (e.g., source of the strategy and utility information, . . . ) and a target (e.g., target of the strategy and utility information, . . . ). Further, the non-cooperative utility value can reflect an estimate of total utility assuming lack of cooperation between the source and the target. According to another example, the strategy and utility information can include a plurality of utility values assuming various constraints upon the target, where the assumed constraints are reported from the source to the target.

At 1606, network-wide utility estimates can be generated for the possible local strategies as a function of the strategy and utility information received from the at least one neighbor base station through message passing and the evaluated local utilities. Message passing can enable each base station to compute network-wide utility estimates associated with respective possible local strategies. Moreover, the network-wide utility estimates can be further generated at least in part as a function of non-cooperative interference information received from the at least one neighbor base station.

At 1608, a particular local strategy from the possible local strategies can be selected for use by the base station based upon the network-wide utility estimates. The particular local strategy can be selected by the base station; similarly, disparate base stations in a wireless communication environment can each likewise select a respective particular local strategy for use thereby. For example, the particular local strategy can yield a maximum (e.g., optimal, . . . ) network-wide utility estimate as compared to network-wide utility estimates corresponding to the remaining possible local strategies. Moreover, the selected particular local strategy can be non-contradictory to particular local strategies respectively selected by disparate base stations in the network (e.g., wireless communication environment, . . . ). Thus, clusters dynamically formed based upon the particular local strategies respectively selected by the base station and the disparate base stations within the network can be non-overlapping.

Referring to FIG. 17, illustrated is a methodology 1700 that facilitates leveraging cooperation between base stations in a wireless communication environment. At 1702, a particular local strategy that includes a base station can be selected as a function of time based upon network-wide utility estimates respectively conditioned upon implementation of the particular local strategy and disparate possible local strategies that include the base station. The particular local strategy can be selected by the base station (e.g. selection can be effectuated in a distributed manner, . . . ). Moreover, a cluster including the base station can be dynamically formed based upon the selected particular local strategy. At 1704, operation within a cluster formed according to the selected particular local strategy can be coordinated. For instance, packets can be shared amongst base stations in the cluster (e.g. for transmission to served mobile device(s), . . . ). Moreover, scheduling within the cluster can be effectuated. According to further examples, at least one of inter-site packet sharing, cooperative beamforming, or cooperative silence can be implemented within the cluster.

According to another example, the base station can exchange transmission information (e.g., related to beams, power spectral densities (PSDs), . . . ) with at least one base station included in at least one different cluster (e.g., at least one different strategy that does not include the base station, . . . ). Following this example, the base station can assess inter-cluster interference based upon transmission information received from the at least one different cluster (e.g., the inter-cluster interference assessment based upon the exchanged interference information can be more refined compared to a long-term interference estimate, . . . ). Moreover, the inter-cluster interference assessment can be factored into a utility computation. However, it is contemplated that the claimed subject matter is not limited to the foregoing example.

It will be appreciated that, in accordance with one or more aspects described herein, inferences can be made regarding dynamically forming clusters in a distributed fashion in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to determining network-wide utilities associated with differing possible local strategies. By way of further illustration, an inference can be made related to identifying constraints associated with various possible local strategies. It will be appreciated that the foregoing examples are illustrative in nature and are not intended to limit the number of inferences that can be made or the manner in which such inferences are made in conjunction with the various embodiments and/or methods described herein.

Figure 18:
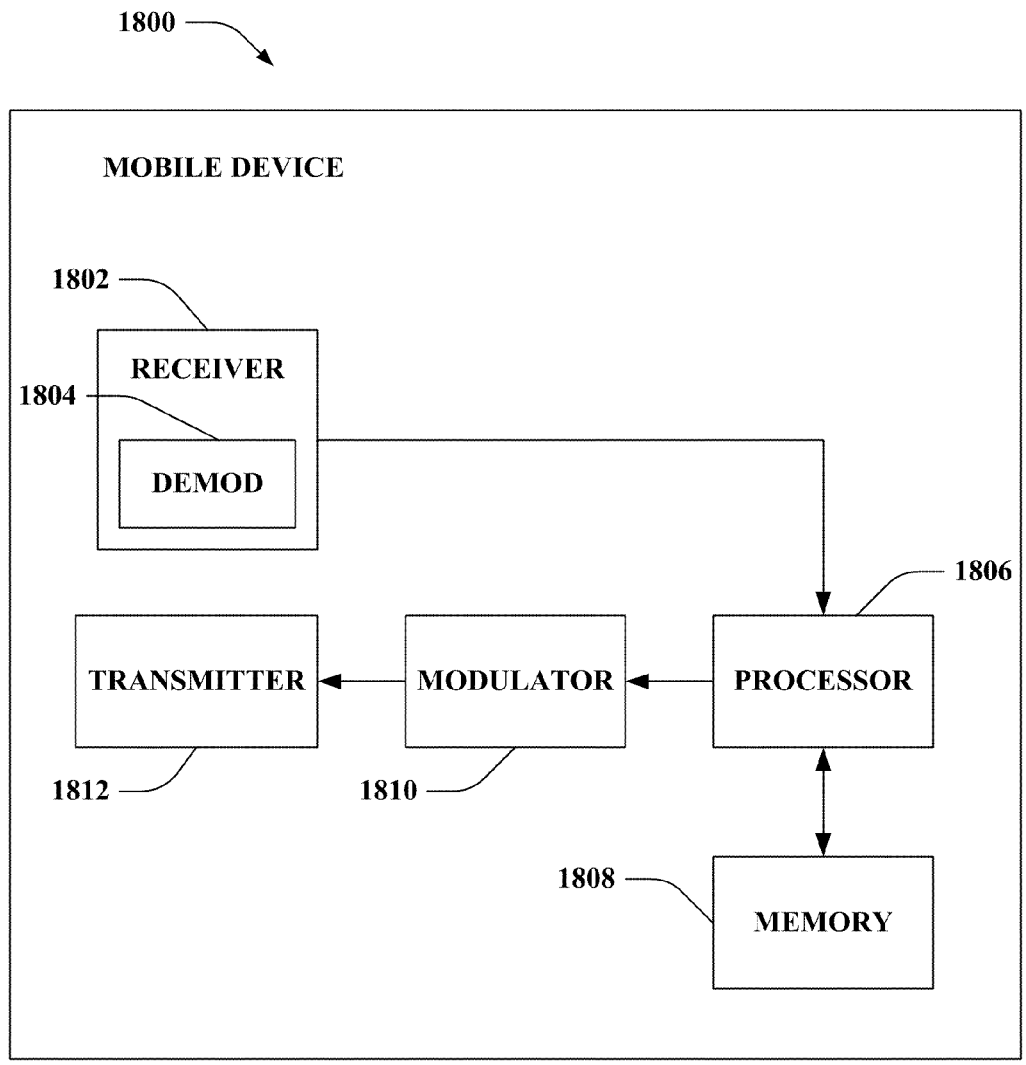
FIG. 18 is an illustration of an example mobile device that can be employed in connection with various aspects described herein.

FIG. 18 is an illustration of a mobile device 1800 that can be employed in connection with various aspects described herein. Mobile device 1800 comprises a receiver 1802 that receives a signal from, for instance, a receive antenna (not shown), and performs typical actions thereon (e.g., filters, amplifies, downconverts, etc.) the received signal and digitizes the conditioned signal to obtain samples. Receiver 1802 can be, for example, an MMSE receiver, and can comprise a demodulator 1804 that can demodulate received symbols and provide them to a processor 1806 for channel estimation. Processor 1806 can be a processor dedicated to analyzing information received by receiver 1802 and/or generating information for transmission by a transmitter 1812, a processor that controls one or more components of mobile device 1800, and/or a processor that both analyzes information received by receiver 1802, generates information for transmission by transmitter 1812, and controls one or more components of mobile device 1800.

Mobile device 1800 can additionally comprise memory 1808 that is operatively coupled to processor 1806 and that can store data to be transmitted, received data, and any other suitable information related to performing the various actions and functions set forth herein.

It will be appreciated that the data store (e.g., memory 1808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1808 of the subject systems and methods is intended to comprise, without being limited to, these and any other suitable types of memory.

Mobile device 1800 still further comprises a modulator 1810 and a transmitter 1812 that transmits data, signals, etc. to a base station. Although depicted as being separate from the processor 1806, it is to be appreciated that modulator 1810 can be part of processor 1806 or a number of processors (not shown).

Figure 19:
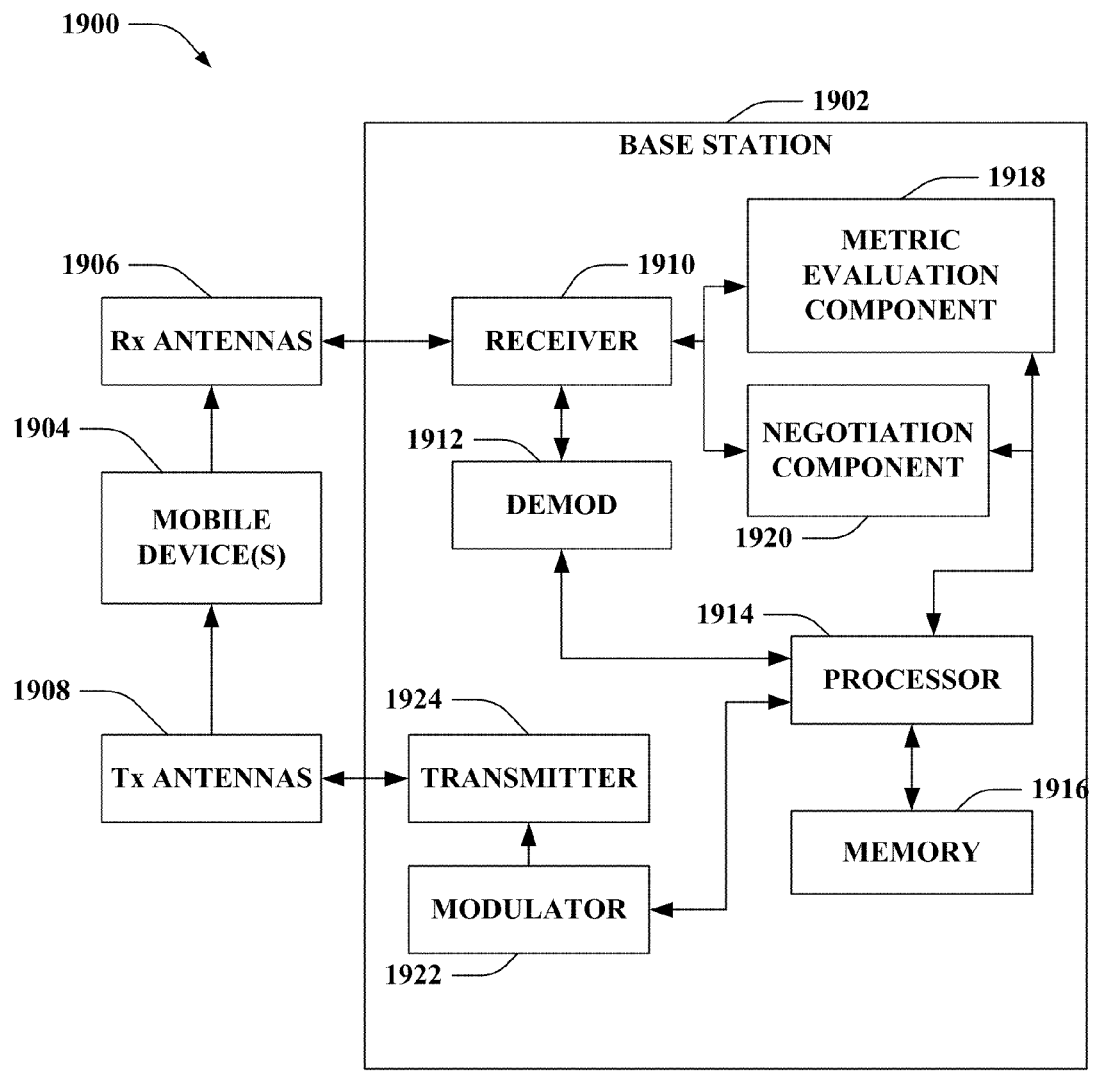
FIG. 19 is an illustration of an example system that dynamically selects a local strategy to employ over time in a wireless communication environment.

FIG. 19 is an illustration of a system 1900 that dynamically selects a local strategy to employ over time in a wireless communication environment. System 1900 comprises a base station 1902 (e.g., access point, . . . ) with a receiver 1910 that receives signal(s) from one or more mobile devices 1904 through a plurality of receive antennas 1906, and a transmitter 1924 that transmits to the one or more mobile devices 1904 through a transmit antenna 1908. Moreover, base station 1902 can receive signal(s) with receiver 1910 from one or more disparate base stations through the plurality of receive antennas 1906 and/or transmit to one or more disparate base stations with transmitter 1924 through the transmit antenna 1908. According to another illustration, base station 1902 can receive signal(s) from (e.g., with receiver 1910, . . . ) and/or transmit signal(s) to (e.g., with transmitter 1924, . . . ) one or more disparate base stations via a backhaul. Receiver 1910 can receive information from receive antennas 1906 and is operatively associated with a demodulator 1912 that demodulates received information. Demodulated symbols are analyzed by a processor 1914 that can be similar to the processor described above with regard to FIG. 18, and which is coupled to a memory 1916 that stores data to be transmitted to or received from mobile device(s) 1904 and/or disparate base station(s) and/or any other suitable information related to performing the various actions and functions set forth herein. Processor 1914 is further coupled to a metric evaluation component 1918 and/or a negotiation component 1920. Metric evaluation component 1918 can be substantially similar to metric evaluation component 408 of FIG. 4 and/or negotiation component 1920 can be substantially similar to negotiation component 410 of FIG. 4. Metric evaluation component 1918 can analyze local utilities associated with possible local strategies that can cover base station 1902. Moreover, negotiation component 1920 can effectuate message passing to exchange strategy and utility information between base station 1902 and neighbor base stations. Further, received strategy and utility information can be evaluated by metric evaluation component 1918 to generate network-wide utility estimates conditioned upon each of the possible local strategies. Based upon such network-wide utility estimates, base station 1902 can elect a particular one of the possible local strategies. Moreover, although not shown, it is to be appreciated that base station 1902 can further include a clustering component (e.g., substantially similar to clustering component 406 of FIG. 4, . . . ) and/or a cooperation component (e.g., substantially similar to cooperation component 710 of FIG. 7, . . . ). Base station 1902 can further include a modulator 1922. Modulator 1922 can multiplex a frame for transmission by a transmitter 1924 through antennas 1908 to mobile device(s) 1904 in accordance with the aforementioned description. Although depicted as being separate from the processor 1914, it is to be appreciated that metric evaluation component 1918, negotiation component 1920, and/or modulator 1922 can be part of processor 1914 or a number of processors (not shown).

Figure 20:
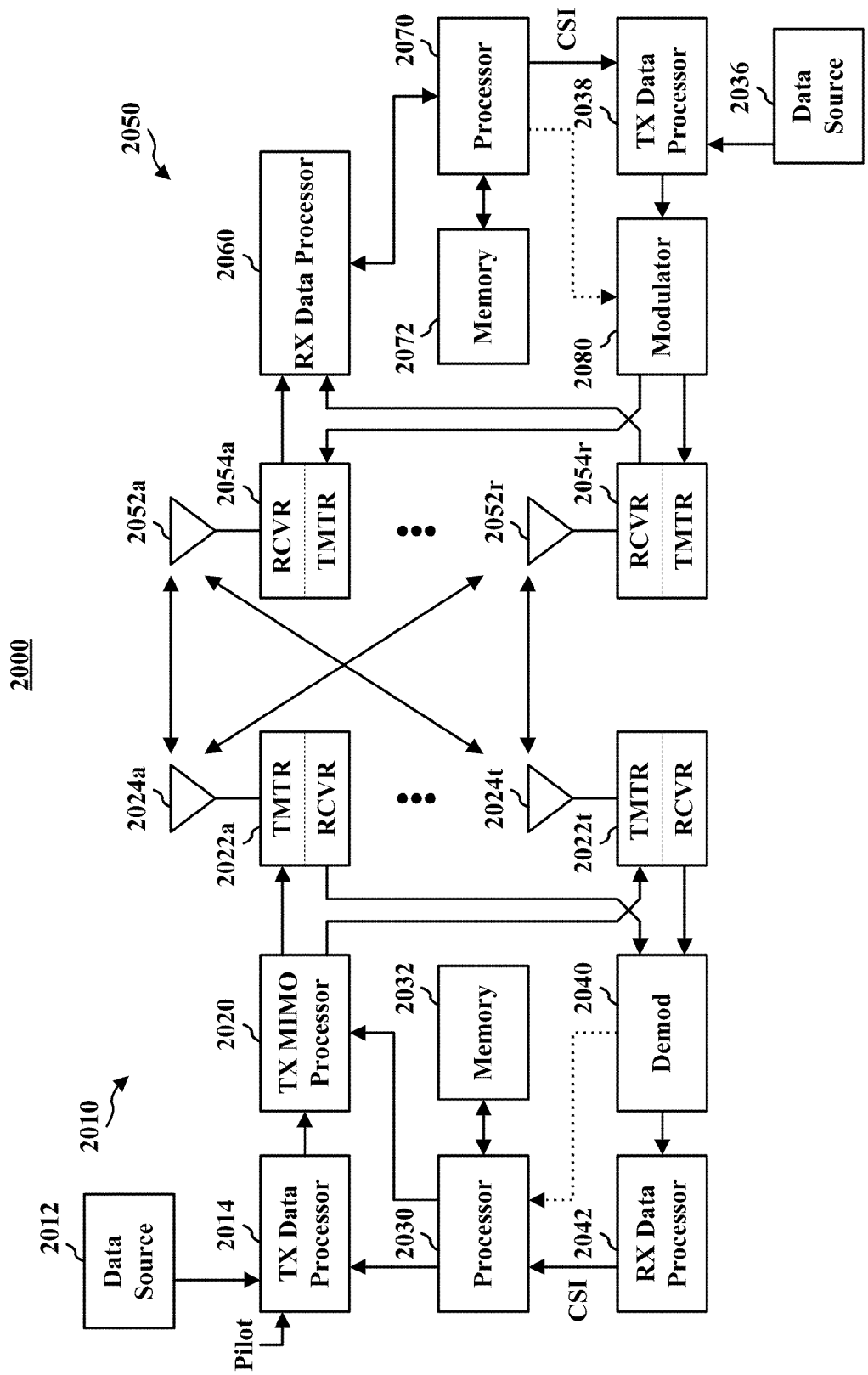
FIG. 20 is an illustration of an example wireless network environment that can be employed in conjunction with the various systems and methods described herein.

FIG. 20 shows an example wireless communication system 2000. The wireless communication system 2000 depicts one base station 2010 and one mobile device 2050 for sake of brevity. However, it is to be appreciated that system 2000 can include more than one base station and/or more than one mobile device, wherein additional base stations and/or mobile devices can be substantially similar or different from example base station 2010 and mobile device 2050 described below. In addition, it is to be appreciated that base station 2010 and/or mobile device 2050 can employ the systems (FIGS. 1-12, 18-19 and 21) and/or methods (FIGS. 16-17) described herein to facilitate wireless communication there between.

At base station 2010, traffic data for a number of data streams is provided from a data source 2012 to a transmit (TX) data processor 2014. According to an example, each data stream can be transmitted over a respective antenna. TX data processor 2014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 2050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 2030. Memory 2032 can store program code, data, and other information used by processor 2030 or other components of base station 2010.

The modulation symbols for the data streams can be provided to a TX MIMO processor 2020, which can further process the modulation symbols (e.g., for OFDM). TX MIMO processor 2020 then provides $N_T$ modulation symbol streams to $N_T$ transmitters (TMTR) 2022a through 2022t. In various embodiments, TX MIMO processor 2020 applies beamforming weights to the symbols of the data streams and to the antenna from which the symbol is being transmitted.

Each transmitter 2022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 2022a through 2022t are transmitted from $N_T$ antennas 2024a through 2024t, respectively.

At mobile device 2050, the transmitted modulated signals are received by $N_R$ antennas 2052a through 2052r and the received signal from each antenna 2052 is provided to a respective receiver (RCVR) 2054a through 2054r. Each receiver 2054 conditions (e.g., filters, amplifies, and downconverts) a respective signal, digitizes the conditioned signal to provide samples, and further processes the samples to provide a corresponding "received" symbol stream.

An RX data processor 2060 can receive and process the $N_R$ received symbol streams from $N_R$ receivers 2054 based on a particular receiver processing technique to provide $N_T$ "detected" symbol streams. RX data processor 2060 can demodulate, deinterleave, and decode each detected symbol stream to recover the traffic data for the data stream. The processing by RX data processor 2060 is complementary to that performed by TX MIMO processor 2020 and TX data processor 2014 at base station 2010.

A processor 2070 can periodically determine which preceding matrix to utilize as discussed above. Further, processor 2070 can formulate a reverse link message comprising a matrix index portion and a rank value portion.

The reverse link message can comprise various types of information regarding the communication link and/or the received data stream. The reverse link message can be processed by a TX data processor 2038, which also receives traffic data for a number of data streams from a data source 2036, modulated by a modulator 2080, conditioned by transmitters 2054a through 2054r, and transmitted back to base station 2010.

At base station 2010, the modulated signals from mobile device 2050 are received by antennas 2024, conditioned by receivers 2022, demodulated by a demodulator 2040, and processed by a RX data processor 2042 to extract the reverse link message transmitted by mobile device 2050. Further, processor 2030 can process the extracted message to determine which preceding matrix to use for determining the beamforming weights.

Processors 2030 and 2070 can direct (e.g., control, coordinate, manage, etc.) operation at base station 2010 and mobile device 2050, respectively. Respective processors 2030 and 2070 can be associated with memory 2032 and 2072 that store program codes and data. Processors 2030 and 2070 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 21:
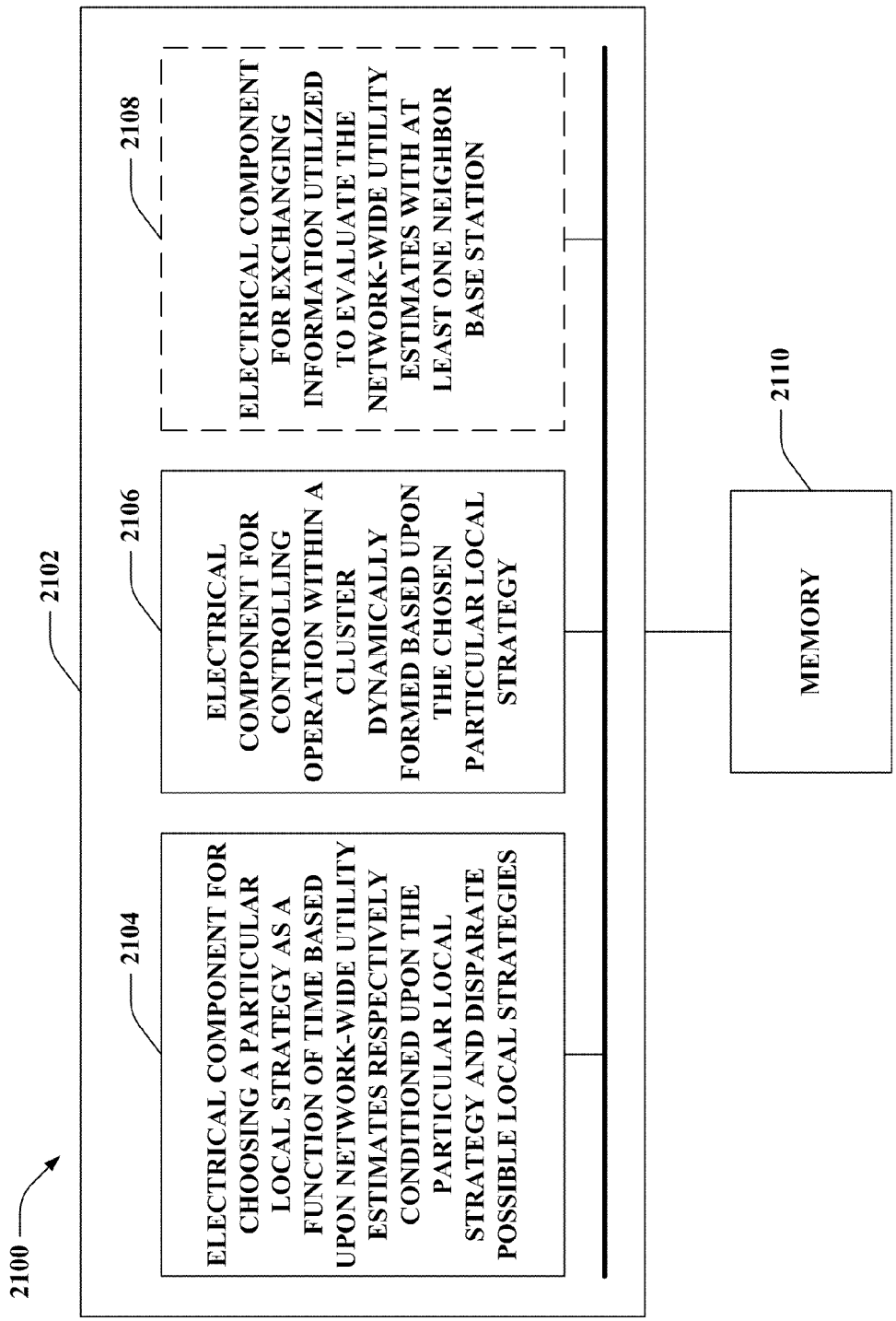
FIG. 21 is an illustration of an example system that enables employing dynamically defined clusters in a wireless communication environment.

With reference to FIG. 21, illustrated is a system 2100 that enables employing dynamically defined clusters in a wireless communication environment. For example, system 2100 can reside at least partially within a base station. It is to be appreciated that system 2100 is represented as including functional blocks, which can be functional blocks that represent functions implemented by a processor, software, or combination thereof (e.g., firmware). System 2100 includes a logical grouping 2102 of electrical components that can act in conjunction. For instance, logical grouping 2102 can include an electrical component for choosing a particular local strategy as a function of time based upon network-wide utility estimates respectively conditioned upon the particular local strategy and disparate possible local strategies 2104. Moreover, logical grouping 2102 can include an electrical component for controlling operation within a cluster dynamically formed based upon the chosen particular local strategy 2106. Further, logical grouping 2102 can optionally include an electrical component for exchanging information utilized to evaluate the network-wide utility estimates with at least one neighbor base station 2108. Additionally, system 2100 can include a memory 2110 that retains instructions for executing functions associated with electrical components 2104, 2106, and 2108.

While shown as being external to memory 2110, it is to be understood that one or more of electrical components 2104, 2106, and 2108 can exist within memory 2110.

The various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g. a combination of a DSP and a microprocessor, a plurality of microprocessors, one or more microprocessors in conjunction with a DSP core, or any other such configuration. Additionally, at least one processor can comprise one or more modules operable to perform one or more of the steps and/or actions described above.

Further, the steps and/or actions of a method or algorithm described in connection with the aspects disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some aspects, the processor and the storage medium can reside in an ASIC. Additionally, the ASIC can reside in a user terminal. In the alternative, the processor and the storage medium can reside as discrete components in a user terminal. Additionally, in some aspects, the steps and/or actions of a method or algorithm can reside as one or any combination or set of codes and/or instructions on a machine readable medium and/or computer readable medium, which can be incorporated into a computer program product.

In one or more aspects, the functions described can be implemented in hardware, software, firmware, or any combination thereof. If implemented in software, the functions can be stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection can be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments can be described or claimed in the singular, the plural is contemplated unless limitation to the singular is explicitly stated. Additionally, all or a portion of any aspect and/or embodiment can be utilized with all or a portion of any other aspect and/or embodiment, unless stated otherwise.

What is claimed is:

1. A method, comprising:
   evaluating local utilities of possible local strategies involving a base station at a given time;
   exchanging strategy and utility information with at least one neighbor base station through message passing;
   generating network-wide utility estimates for the possible local strategies as a function of the strategy and utility information received from the at least one neighbor base station through message passing and the evaluated local utilities; and
   forming a cluster of base stations based on a particular local strategy from the possible local strategies and the network-wide utility estimates.

2. The method of claim 1, wherein each of the possible local strategies includes one or more base stations, one or more mobile devices served by the one or more base stations, and underlying antenna weights and power spectral densities for the one or more base stations to serve the one or more mobile devices.

3. The method of claim 1, wherein each of the possible local strategies are subject to a limited maximum order constraint.

4. The method of claim 1, evaluating the local utilities of the possible local strategies further comprises summing weighted rates achieved by one or more mobile devices respectively served under each of the possible local strategies.

5. The method of claim 1, wherein message passing is iterative.

6. The method of claim 1, wherein exchanging the strategy and utility information further comprises:
   transmitting the strategy and utility information yielded by the base station to the at least one neighbor base station; and
   receiving the strategy and utility information respectively yielded by each of the at least one neighbor base station from the at least one neighbor base station.

7. The method of claim 1, wherein the strategy and utility information includes a cooperative utility value and a non-cooperative utility value.

8. The method of claim 7, wherein the cooperative utility value reflects an estimate of total utility assuming cooperation between a source and a target and the non-cooperative utility value reflects an estimate of total utility assuming lack of cooperation between the source and the target.

9. The method of claim 1, wherein the strategy and utility information includes a plurality of utility values assuming various constraints upon a target, wherein the assumed constraints are reported from a source to the target.

10. The method of claim 1, wherein generating the network-wide utility estimates further comprises generating the network-wide utility estimates at least in part as a function of non-cooperative interference information received from the at least one neighbor base station.

11. The method of claim 1, wherein the particular local strategy yields a maximum network-wide utility estimate as compared to network-wide utility estimates corresponding to remaining possible local strategies.

12. The method of claim 1, wherein the particular local strategy is non-contradictory to particular local strategies respectively used by disparate base stations in a network.

13. The method of claim 12, wherein clusters dynamically formed based upon the particular local strategies respectively by the base station and the disparate base stations in the network are non-overlapping.

14. The method of claim 1, further comprising coordinating operation within a cluster formed according to the selected particular local strategy.

15. The method of claim 14, further comprising sharing packets amongst base stations in the cluster.

16. The method of claim 14, further comprising implementing at least one of inter-site packet sharing, cooperative beamforming, or cooperative silence within the cluster.

17. The method of claim 14, further comprising exchanging transmission information with at least one base station included in at least one different cluster to enable assessing inter-cluster interference.

18. A wireless communications apparatus, comprising:
at least one processor configured to:
analyze local utilities of possible local strategies involving a base station at a given time;
implement message passing to exchange strategy and utility information with at least one neighbor base station;
estimate network-wide utilities for the possible local strategies as a function of the strategy and utility information obtained from the at least one neighbor base station and the analyzed local utilities; and
form a cluster of base stations based upon a particular local strategy chosen from the possible local strategies based upon the-estimated network-wide utilities.

19. The wireless communications apparatus of claim 18, wherein each of the possible local strategies includes one or more base stations, one or more mobile devices served by the one or more base stations, and underlying antenna weights and power spectral densities for the one or more base stations to serve the one or more mobile devices.

20. The wireless communications apparatus of claim 18, wherein each of the possible local strategies are subject to a limited maximum order constraint.

21. The wireless communications apparatus of claim 18, further comprising:
at least one processor configured to:
sum weighted rates achieved by one or more mobile devices respectively served under each of the possible local strategies to yield the local utilities.

22. The wireless communications apparatus of claim 18, wherein the strategy and utility information includes a cooperative utility value and a non-cooperative utility value.

23. The wireless communications apparatus of claim 18, wherein the strategy and utility information includes a plurality of utility values assuming various constraints upon a target, wherein the assumed constraints are reported from a source to the target.

24. The wireless communications apparatus of claim 18, further comprising:
at least one processor configured to:
estimate the network-wide utilities based at least in part upon non-cooperative interference information obtained from the at least one neighbor base station.

25. The wireless communications apparatus of claim 18, further comprising:
at least one processor configured to:
identify the particular local strategy as corresponding to an optimal value from the estimated network-wide utilities; and
choose the particular local strategy based upon the identified correspondence to the optimal value.

26. The wireless communications apparatus of claim 18, wherein the cluster and disparate clusters dynamically formed in a network are non-overlapping.

27. The wireless communications apparatus of claim 18, further comprising:
at least one processor configured to:
control operation within the cluster by implementing at least one of inter-site packet sharing, cooperative beamforming, or cooperative silence within the cluster.

28. The wireless communications apparatus of claim 27, further comprising:
at least one processor configured to:
share packets between base stations included in the cluster.

29. The wireless communications apparatus of claim 18, further comprising:
at least one processor configured to:
exchange transmission information related to one or more of beams or power spectral densities (PSDs) with at least one base station included in at least one disparate cluster to enable analyzing inter-cluster interference.

30. A computer program product, comprising:
a non-transitory computer-readable medium comprising:
code for evaluating local utilities of possible local strategies involving a base station at a given time;
code for exchanging strategy and utility information with at least one neighbor base station through message passing;
code for generating network-wide utility estimates for the possible local strategies as a function of the strategy and utility information received from the at least one neighbor base station through message passing and the evaluated local utilities; and
code for forming a cluster of base stations based on a particular local strategy from the possible local strategies and the network-wide utility estimates.

31. The computer program product of claim 30, wherein each of the possible local strategies includes one or more base stations, one or more mobile devices served by the one or more base stations, and underlying antenna weights and power spectral densities for the one or more base stations to serve the one or more mobile devices.

32. The computer program product of claim 30, wherein each of the possible local strategies are subject to a limited maximum order constraint.

33. The computer program product of claim 30, wherein the code for evaluating the local utilities of the possible local strategies further comprises code for summing weighted rates achieved by one or more mobile devices respectively served under each of the possible local strategies.

34. The computer program product of claim 30, wherein message passing is iterative.

35. The computer program product of claim 30, wherein the code for exchanging the strategy and utility information further comprises:
- code for transmitting the strategy and utility information yielded by the base station to the at least one neighbor base station; and
- code for receiving the strategy and utility information respectively yielded by each of the at least one neighbor base station from the at least one neighbor base station.

36. The computer program product of claim 30, wherein the strategy and utility information includes a cooperative utility value and a non-cooperative utility value.

37. The computer program product of claim 36, wherein the cooperative utility value reflects an estimate of total utility assuming cooperation between a source and a target and the non-cooperative utility value reflects an estimate of total utility assuming lack of cooperation between the source and the target.

38. The computer program product of claim 30, wherein the strategy and utility information includes a plurality of utility values assuming various constraints upon a target, wherein the assumed constraints are reported from a source to the target.

39. The computer program product of claim 30, wherein the code for generating the network-wide utility estimates further comprises code for generating the network-wide utility estimates at least in part as a function of non-cooperative interference information received from the at least one neighbor base station.

40. The computer program product of claim 30, wherein the particular local strategy yields a maximum network-wide utility estimate as compared to network-wide utility estimates corresponding to remaining possible local strategies.

41. The computer program product of claim 30, wherein the particular local strategy is non-contradictory to particular local strategies respectively used by disparate base stations in a network.

42. The computer program product of claim 41, wherein clusters dynamically formed based upon the particular local strategies respectively used by the base station and the disparate base stations in the network are non-overlapping.

43. The computer program product of claim 30, wherein the non-transitory computer-readable medium further comprises code for coordinating operation within a cluster formed according to the selected particular local strategy.

44. The computer program product of claim 43, wherein the non-transitory computer-readable medium further comprises code for sharing packets amongst base stations in the cluster.

45. The computer program product of claim 43, wherein the non-transitory computer-readable medium further comprises code for implementing at least one of inter-site packet sharing, cooperative beamforming, or cooperative silence within the cluster.

46. The computer program product of claim 30, wherein the non-transitory computer-readable medium further comprises code for exchanging transmission information with at least one base station included in at least one different cluster to enable assessing inter-cluster interference.

47. An apparatus, comprising:
- means for evaluating local utilities of possible local strategies involving a base station at a given time;
- means for exchanging strategy and utility information with at least one neighbor base station through message passing;
- means for generating network-wide utility estimates for the possible local strategies as a function of the strategy and utility information received from the at least one neighbor base station through message passing and the evaluated local utilities; and
- means for forming a cluster of base stations based on a particular local strategy from the possible local strategies and the network-wide utility estimates.

* * * * *